US011095412B2

(12) United States Patent
Dou et al.

(10) Patent No.: US 11,095,412 B2
(45) Date of Patent: Aug. 17, 2021

(54) UPLINK MEASUREMENT REFERENCE SIGNAL TRANSMISSION METHOD, APPARATUS, AND SYSTEM

(71) Applicant: HUAWEI TECHNOLOGIES CO., LTD., Guangdong (CN)

(72) Inventors: Shengyue Dou, Shanghai (CN); Ting Wang, Shanghai (CN); Yi Qin, Kista (SE); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/402,975

(22) Filed: May 3, 2019

(65) Prior Publication Data

US 2019/0260544 A1 Aug. 22, 2019

Related U.S. Application Data

(63) Continuation of application No. PCT/CN2017/109385, filed on Nov. 3, 2017.

(30) Foreign Application Priority Data

Nov. 4, 2016 (CN) .................. CN201610964711.X
Aug. 10, 2017 (CN) .................. CN201710682220.0

(51) Int. Cl.
*H04L 5/00* (2006.01)
*H04W 72/04* (2009.01)
(Continued)

(52) U.S. Cl.
CPC .......... *H04L 5/0051* (2013.01); *H04L 5/0048* (2013.01); *H04L 5/0053* (2013.01);
(Continued)

(58) Field of Classification Search
CPC ... H04L 5/0051; H04L 5/0048; H04L 5/0053; H04L 5/0091; H04W 72/042;
(Continued)

(56) References Cited

U.S. PATENT DOCUMENTS 9,270,435 B2  2/2016  Lindholm et al.
10,200,168 B2 * 2/2019  Liu ....................... H04L 1/0003
(Continued)

FOREIGN PATENT DOCUMENTS

CN    102694622 A    9/2012
CN    103297153 A    9/2013
(Continued)

OTHER PUBLICATIONS

3GPP TS 36.211 V14.0.0 (Sep. 2016);3rd Generation Partnership Project;Technical Specification Group Radio Access Network;Evolved Universal Terrestrial Radio Access (E-UTRA);Physical channels and modulation(Release 14);total 170 pages.
(Continued)

*Primary Examiner* — Ayaz R Sheikh
*Assistant Examiner* — Louis Samara
(74) *Attorney, Agent, or Firm* — Womble Bond Dickinson (US) LLP

(57) ABSTRACT

An uplink reference signal transmission method is disclosed. User equipment receives first configuration information of a first uplink measurement reference signal and second configuration information of a second uplink measurement reference signal from a wireless network device. The first configuration information is used to configure a time-frequency resource of the first uplink measurement reference signal, and the second configuration information is used to configure a time-frequency resource of the second uplink measurement reference signal. The first uplink measurement reference signal is a zero-power uplink measurement refer-
(Continued)

ence signal, and the second uplink measurement reference signal is a non-zero-power uplink measurement reference signal. The user equipment sends, based on the first configuration information and the second configuration information, the second uplink measurement reference signal on a time-frequency resource, other than the time-frequency resource of the first uplink measurement reference signal, in the time-frequency resource of the second uplink measurement reference signal.

19 Claims, 6 Drawing Sheets

(51) Int. Cl.
  *H04W 72/08* (2009.01)
  *H04W 36/00* (2009.01)
  *H04W 76/27* (2018.01)
  *H04W 24/10* (2009.01)
(52) U.S. Cl.
  CPC ......... *H04L 5/0091* (2013.01); *H04W 72/042* (2013.01); *H04W 72/0446* (2013.01); *H04W 72/0453* (2013.01); *H04W 72/082* (2013.01); *H04W 24/10* (2013.01); *H04W 36/00* (2013.01); *H04W 76/27* (2018.02)
(58) Field of Classification Search
  CPC ......... H04W 72/0446; H04W 72/0453; H04W 72/082; H04W 76/27; H04W 24/10; H04W 36/00
  See application file for complete search history.

(56) References Cited

U.S. PATENT DOCUMENTS

| | | | | |
|---|---|---|---|---|
| 10,389,498 | B2* | 8/2019 | Park | H04B 7/066 |
| 10,397,921 | B2* | 8/2019 | Kusashima | H04W 72/0453 |
| 2012/0140649 | A1* | 6/2012 | Choudhury | H04L 1/0027 |
| | | | | 370/252 |
| 2014/0269451 | A1* | 9/2014 | Papasakellariou | H04B 7/2656 |
| | | | | 370/280 |
| 2015/0029964 | A1* | 1/2015 | Seo | H04L 5/001 |
| | | | | 370/329 |
| 2015/0131563 | A1 | 5/2015 | Guo et al. | |
| 2015/0171948 | A1* | 6/2015 | Xiao | H04L 1/0077 |
| | | | | 370/252 |
| 2016/0248567 | A1 | 8/2016 | Chen et al. | |
| 2017/0237535 | A1* | 8/2017 | Park | H04W 72/0426 |
| | | | | 370/329 |
| 2018/0115389 | A1 | 4/2018 | Chen et al. | |
| 2020/0337065 | A1* | 10/2020 | Dinan | H04L 27/0006 |

FOREIGN PATENT DOCUMENTS

| | | | | |
|---|---|---|---|---|
| CN | 103491637 | A | 1/2014 | |
| CN | 103580819 | A | 2/2014 | |
| CN | 105991231 | A | 10/2016 | |
| EP | 2579490 | A2 | 4/2013 | |
| JP | 5927801 | B2 * | 6/2016 | H04W 52/242 |
| WO | 20121077822 | A1 | 6/2012 | |
| WO | WO-2016134585 | A1 * | 9/2016 | H04L 5/005 |
| WO | 2017017564 | A1 | 2/2017 | |

OTHER PUBLICATIONS

3GPP TS 36.213 V14.0.0 (Sep. 2016);3rd Generation Partnership Project;Technical Specification Group Radio Access Network;Evolved Universal Terrestrial Radio Access (E-UTRA);Physical layer procedures(Release 14);total 406 pages.
3GPP TS 36.331 V13.0.0 (Dec. 2015);3rd Generation Partnership Project;Technical Specification Group Radio Access Network;Evolved Universal Terrestrial Radio Access (E-UTRA);Radio Resource Control (RRC);Protocol specification(Release 13);total 507 pages.
Ericsson, "On UL RS for CSI measurements",3GPP TSG-RAN WG1 #86bis R1-1609764,Lisbon, Portugal, Oct. 10-14, 2016,total 4 pages.
Nokia et al., "UL SRS design considerations in NR",3GPP TSG-RAN WG1 Meeting #86bis R1-1610273,Lisbon, Portugal, Oct. 10-14, 2016,total 4 pages.

* cited by examiner

UPLINK MEASUREMENT REFERENCE SIGNAL TRANSMISSION METHOD, APPARATUS, AND SYSTEM

CROSS-REFERENCE TO RELATED APPLICATIONS

This application is a continuation of International Application No. PCT/CN2017/109385, filed on Nov. 3, 2017, which claims priority to Chinese Patent Application No. 201710682220.0, filed on Aug. 10, 2017 and Chinese Patent Application No. 201610964711.X, filed on Nov. 4, 2016. The disclosures of the aforementioned applications are hereby incorporated by reference in their entireties.

TECHNICAL FIELD

The present invention relates to the field of communications technologies, and in particular, to an uplink measurement reference signal transmission method, an apparatus, and a system.

BACKGROUND

FIG. 1 is a structural diagram of a communications system. The communications system includes a plurality of network devices (for example, base stations) and a plurality of user equipment (UE) within coverage of each network device.

In the communications system such as New Radio (NR) system, the user equipment (UE) may send an uplink measurement reference signal (for example, a sounding reference signal (SRS) in an LTE system, or another newly-defined uplink measurement reference signal, and the network device may estimate a channel state of an uplink channel based on the uplink measurement reference signal sent by the UE, so that the network device performs uplink data scheduling (for example, frequency selective scheduling or modulation and coding scheme (MCS) selection) based on the estimated uplink channel state. When the communications system is a time division duplex (TDD) system, the network device may further estimate a downlink channel state based on channel reciprocity by using the uplink measurement reference signal sent by the UE.

In a cell, a time-frequency-code resource used by each UE to send an uplink measurement reference signal, for example, an SRS, is configured by a base station. For UEs located on cell edges, because adjacent base stations separately perform configuration, different UEs in two neighboring cells send uplink measurement reference signals on a same time-frequency-code resource. This causes interference between uplink measurement reference signals of UEs located on the cell edges, and further affects channel sounding quality of the UEs located on the cell edges.

Therefore, how to measure interference caused to an uplink measurement reference signal of UE becomes a problem that needs to be urgently resolved first.

SUMMARY

Embodiments of the present invention provide an uplink reference signal transmission method, an apparatus, a communications system, and a terminal, so that interference caused to an uplink reference signal of UE is measurable.

According to a first aspect, an embodiment of the present invention provides an uplink reference signal transmission method, including:

receiving, by user equipment, first configuration information of a first uplink measurement reference signal and second configuration information of a second uplink measurement reference signal from a wireless network device, where the first configuration information is used to configure a time-frequency resource of the first uplink measurement reference signal, the second configuration information is used to configure a time-frequency resource of the second uplink measurement reference signal, the first uplink measurement reference signal is a zero-power uplink measurement reference signal, and the second uplink measurement reference signal is a non-zero-power uplink measurement reference signal; and sending, by the user equipment based on the first configuration information and the second configuration information, the second uplink measurement reference signal on a time-frequency resource, other than the time-frequency resource of the first uplink measurement reference signal, in the time-frequency resource of the second uplink measurement reference signal.

In this manner, because a non-zero-power uplink measurement reference signal is not sent on the time-frequency resource of the first uplink measurement reference signal, but instead is sent in the time-frequency resource of the second uplink measurement reference signal, the wireless network device may receive, on the time-frequency resource of the first uplink measurement reference signal, an uplink measurement reference signal or data that is sent by another user equipment, so that the wireless network device implements interference measurement on the resource, and then can perform an operation such as power control, interference suppression, interference cancellation, or resource reconfiguration based on a measurement result, thereby reducing interference caused to an uplink measurement reference signal of the UE.

In one embodiment, the first configuration information and the second configuration information are carried in a same message or carried in different messages. In other words, the first configuration information and the second configuration information may not be simultaneously received, or may be simultaneously received. A specific manner may be determined based on a protocol setting or a system requirement.

In this application, "simultaneously" may indicate a same time domain unit (which may also be referred to as a time domain resource unit) in a 5G NR system. The time domain unit may be, for example, a subframe, a slot, or a mini-slot.

In one embodiment, the sending, by the user equipment based on the first configuration information and the second configuration information, the second uplink measurement reference signal on a time-frequency resource, other than the time-frequency resource of the first uplink measurement reference signal, in the time-frequency resource of the second uplink measurement reference signal includes: sending, by the user equipment, the second uplink measurement reference signal on the time-frequency resource, other than the time-frequency resource that is of the first uplink measurement reference signal and that is indicated by the first configuration information, in the time-frequency resource that is of the second uplink measurement reference signal and that is indicated by the second configuration information.

In one embodiment, the user equipment may further send the first uplink measurement reference signal on the time-frequency resource that is of the first uplink measurement reference signal and that is indicated by the first configuration information.

In one embodiment, the time-frequency resource of the first uplink measurement reference signal is a subset of the time-frequency resource of the second uplink measurement reference signal.

In one embodiment, the first configuration information and/or the second configuration information are/is carried in higher layer signaling.

In one embodiment, the first configuration information and/or the second configuration information are/is carried in a downlink control channel, for example, in downlink control information of the downlink control channel.

In one embodiment, the first configuration information of the first uplink measurement reference signal and the second configuration information of the second uplink measurement reference signal are included in a same uplink measurement reference signal process. Therefore, an association between the first configuration information and the second configuration information can be indicated, and further a form of the first configuration information can be more flexible.

In one embodiment, one uplink measurement reference signal process (SRS process) may include one or more zero-power uplink measurement reference signal resources and one or more non-zero-power uplink measurement reference signal resources. The one or more zero-power uplink measurement reference signal resources are included in the first configuration information, and the one or more non-zero-power uplink measurement reference signal resources are included in the second configuration information.

In one embodiment, configuration signaling (a configuration message) of the second configuration information is multiplexed with the first configuration information, and a first indication is used to determine that the configuration signaling carries the first configuration information and/or the second configuration information. In this way, the existing second configuration information can be compatible, thereby simplifying the configuration signaling.

In one embodiment, the configuration signaling includes the first indication; or the first indication is not included in the configuration signaling, but is carried in other signaling (another message). A specific manner of sending the first indication may be determined based on a protocol setting or a system requirement.

In one embodiment, the first configuration information and the second configuration information are carried in different configuration signaling (configuration messages). Therefore, the first configuration information can be more flexible.

In one embodiment, the first indication is carried in downlink control information (DCI) or higher layer signaling. A specific sending manner may be determined based on a protocol setting or a system requirement. In one embodiment, "carried in DCI" may be "carried by using a specific information element in the DCI", or may be "carried by using a format of the DCI". This is not limited herein. As such, "carried in DCI" may encompass a similar description that is mentioned in other parts of the embodiments of this application.

In one embodiment, the first configuration information may be a configuration for periodic transmission of the first uplink measurement reference signal, a configuration for aperiodic transmission of the first uplink measurement reference signal, or a configuration for semi-persistent (semi-persistent) transmission of the first uplink measurement reference signal. The semi-persistent transmission may be activated through triggering of DCI or a media access control, control element (MAC CE), and may be deactivated through triggering of DCI or a MAC CE. Alternatively, the semi-persistent transmission may be activated through triggering of DCI or a MAC CE, and deactivated after a period of time. The period of time may be specified by a protocol (without being configured by a base station, or may be locally pre-stored or preconfigured), or may be configured by a base station. Alternatively, the semi-persistent transmission may be activated after configuration information is received for a period of time, and deactivated through triggering of DCI or a MAC CE, or deactivated after a period of time. The period of time between a time at which the configuration information is received and a time at which the activation is performed may be specified by a protocol (without being configured by a base station, or may be locally pre-stored or preconfigured), or may be configured by a base station. The period of time between the time at which the activation is performed and a time at which the deactivation is performed may also be specified by the protocol (without being configured by the base station, or may be locally pre-stored or preconfigured), or may be configured by the base station.

In one embodiment, the method further includes: receiving, by the user equipment, a second indication from the wireless network device, where the second indication is used to indicate whether the first uplink measurement reference signal for which configuration is performed by using the first configuration information is subject to periodic transmission, aperiodic transmission, or semi-persistent transmission.

In one embodiment, the second indication is carried in higher layer signaling, or is carried in a downlink control channel, for example, in DCI of the downlink control channel.

In one embodiment, the second configuration information may be a configuration for periodic transmission of the second uplink measurement reference signal, a configuration for aperiodic transmission of the second uplink measurement reference signal, or a configuration for semi-persistent transmission of the second uplink measurement reference signal. The user equipment may receive a third indication from the wireless network device. The third indication is used to indicate whether the second uplink measurement reference signal for which configuration is performed by using the second configuration information is subject to periodic transmission, aperiodic transmission, or semi-persistent transmission. The second indication and the third indication may be different signaling or may be same signaling. For example, when configuration signaling is multiplexed for the first configuration information and the second configuration information, the second indication and the third indication may be a same indication, or may indicate, by using a same indication, whether configuration performed by using the first configuration information and the second configuration information is applicable to periodic transmission, aperiodic transmission, or semi-persistent transmission.

In one embodiment, the first configuration information of the first uplink measurement reference signal is used for aperiodic transmission, and the receiving, by user equipment, first configuration information of a first uplink measurement reference signal from a wireless network device includes:

receiving, by the user equipment, the first configuration information of the first uplink measurement reference signal from the wireless network device, where the first configuration information is used to indicate a plurality of groups of time-frequency resources of the first uplink measurement reference signal; and the method further includes: receiving, by the user equipment, trigger information from the wireless network device, where the trigger information is used to trigger at least one of the plurality of groups of time-frequency resources; and sending, by the user equipment, the second uplink measurement reference signal on a time-frequency resource, other than the triggered time-frequency resource in the plurality of groups of time-frequency resources, in the time-frequency resource of the second uplink measurement reference signal.

In this way, because the configuration information for aperiodic transmission and the trigger information are separately sent, time for sending the configuration information for aperiodic transmission can be reduced, thereby reducing configuration overheads.

In one embodiment, the user equipment sends the first uplink measurement reference signal on the triggered time-frequency resource in the plurality of groups of time-frequency resources.

In one embodiment, the first configuration information is carried in higher layer signaling, and the trigger information is carried in a downlink control channel, for example, carried in downlink control information (DCI) of the downlink control channel.

In this way, dynamic-signaling overheads of the configuration information can be reduced.

According to a second aspect, an embodiment of the present invention further provides an uplink measurement reference signal transmission method. The method is described from a perspective of a wireless network device. Reference may be made to the uplink measurement reference signal transmission method provided in the first aspect. The method may include:

sending, by a wireless network device, first configuration information of a first uplink measurement reference signal and second configuration information of a second uplink measurement reference signal to user equipment, where the first configuration information is used to configure a time-frequency resource of the first uplink measurement reference signal, the second configuration information is used to configure a time-frequency resource of the second uplink measurement reference signal, the first uplink measurement reference signal is a zero-power uplink measurement reference signal, and the second uplink measurement reference signal is a non-zero-power uplink measurement reference signal; and receiving, by the wireless network device, the second uplink measurement reference signal from the user equipment, where the second uplink measurement reference signal is carried in a time-frequency resource, other than the time-frequency resource of the first uplink measurement reference signal, in the time-frequency resource of the second uplink measurement reference signal.

In one embodiment, the time-frequency resource of the first uplink measurement reference signal is a subset of the time-frequency resource of the second uplink measurement reference signal.

In one embodiment, the first configuration information and the second configuration information are carried in a same message or carried in different messages. In other words, the first configuration information and the second configuration information may not be simultaneously sent, or may be simultaneously sent. A specific manner may be determined based on a protocol setting or a system requirement.

In one embodiment, the method further includes:

receiving, by the wireless network device, a signal from another user equipment on the time-frequency resource of the first uplink measurement reference signal.

In one embodiment, the signal of the another user equipment includes an uplink measurement reference signal or a data signal of the another user equipment.

In one embodiment, the first configuration information and/or the second configuration information are/is carried in higher layer signaling.

In one embodiment, the first configuration information and/or the second configuration information are/is carried in a downlink control channel, for example, in downlink control information (DCI) of the downlink control channel.

Optionally, the first configuration information of the first uplink measurement reference signal and the second configuration information of the second uplink measurement reference signal are included in a same uplink measurement reference signal process. Therefore, an association between the first configuration information and the second configuration information can be indicated, and further a form of the first configuration information can be more flexible.

In one embodiment, configuration signaling (a configuration message) of the second configuration information is multiplexed with the first configuration information, and a first indication is used to determine that the configuration signaling carries the first configuration information and/or the second configuration information. In this way, the existing second configuration information can be compatible, thereby simplifying the configuration signaling.

In one embodiment, the configuration signaling includes the first indication; or the first indication is not included in the configuration signaling, but is carried in other signaling (another message). A specific manner of sending the first indication may be determined based on a protocol setting or a system requirement.

In one embodiment, the first configuration information and the second configuration information are carried in different configuration signaling (configuration messages). Therefore, the first configuration information can be more flexible.

In one embodiment, the first indication is carried in downlink control information (DCI) or higher layer signaling. A specific sending manner may be determined based on a protocol setting or a system requirement.

In one embodiment, the first configuration information may be a configuration for periodic transmission of the first uplink measurement reference signal, a configuration for aperiodic transmission of the first uplink measurement reference signal, or a configuration for semi-persistent transmission of the first uplink measurement reference signal.

In one embodiment, the method further includes:

sending, by the wireless network device, a second indication to the UE, where the second indication is used to indicate whether the first uplink measurement reference signal for which configuration is performed by using the first configuration information is subject to periodic transmission, aperiodic transmission, or semi-persistent transmission.

In one embodiment, the second indication is carried in higher layer signaling, or is carried in a downlink control channel, for example, in downlink control information (DCI) of the downlink control channel.

In one embodiment, the second configuration information may be a configuration for periodic transmission of the second uplink measurement reference signal, a configuration for aperiodic transmission of the second uplink measurement reference signal, or a configuration for semi-persistent transmission of the second uplink measurement reference signal. The wireless network device may send a third indication to the UE. The third indication is used to indicate whether the second uplink measurement reference signal for which configuration is performed by using the second configuration information is subject to periodic transmission, aperiodic transmission, or semi-persistent transmission. The second indication and the third indication may be different signaling or may be same signaling. For example, when configuration signaling is multiplexed for the first configuration information and the second configuration information, the second indication and the third indication may be a same indication, or may indicate, by using a same indication, whether configuration performed by using the first configuration information and the second configuration information is applicable to periodic transmission, aperiodic transmission, or semi-persistent transmission.

In one embodiment, the first configuration information of the first uplink measurement reference signal is used for aperiodic transmission, and the sending, by a wireless network device, first configuration information of a first uplink measurement reference signal to the user equipment includes:

sending, by the wireless network device, the first configuration information of the first uplink measurement reference signal to the user equipment, where the first configuration information is used to indicate a plurality of groups of time-frequency resources of the first uplink measurement reference signal; and the method further includes: sending, by the wireless network device, trigger information to the user equipment, where the trigger information is used to trigger at least one of the plurality of pieces of configuration information, where the second uplink measurement reference signal received by the wireless network device from the user equipment is carried in a time-frequency resource, other than the triggered time-frequency resource in the plurality of groups of time-frequency resources, in the time-frequency resource of the second uplink measurement reference signal.

In this way, because the configuration information for aperiodic transmission and the trigger information are separately sent, time for sending the configuration information for aperiodic transmission can be reduced, thereby reducing configuration overheads.

In one embodiment, the first configuration information is carried in higher layer signaling, and the trigger information is carried in downlink control information (DCI).

According to a third aspect, user equipment is further provided, including a processor, a memory, and a transceiver.

The memory is configured to store an instruction; the processor is configured to execute the instruction stored in the memory, to control the transceiver to receive and send signals; and when the processor executes the instruction stored in the memory, the user equipment is configured to complete any method that is related to the user equipment and that is described in the first aspect.

According to a fourth aspect, a wireless network device is further provided, including a processor, a memory, and a transceiver.

The memory is configured to store an instruction; the processor is configured to execute the instruction stored in the memory, to control the transceiver to receive and send signals; and when the processor executes the instruction stored in the memory, the wireless network device is configured to complete any method that is related to the wireless network device and that is described in the second aspect.

According to a fifth aspect, an uplink reference signal transmission apparatus is further provided. The apparatus includes some modules, configured to implement any method related to the foregoing user equipment. Specific modules may be corresponding to the method operations, and details are not described herein.

According to a sixth aspect, an uplink reference signal transmission apparatus is further provided. The apparatus includes some modules, configured to implement any method related to the foregoing wireless network device. Specific modules may be corresponding to the method operations, and details are not described herein.

According to a seventh aspect, a computer storage medium is further provided. The computer storage medium is configured to store some instructions. When the instructions are executed, any method related to the foregoing user equipment or wireless network device can be completed.

According to an eighth aspect, a communications system is further provided, including the user equipment provided in the third aspect and the wireless network device provided in the fourth aspect.

According to a ninth aspect, a communications apparatus is further provided. The apparatus has a function of implementing behavior of the wireless network device or the user equipment in the foregoing method operations. The apparatus includes corresponding components (means) configured to perform the steps or the functions described in the foregoing method aspects. The steps or the functions may be implemented by software, hardware, or a combination of hardware and software.

In one embodiment, the communications apparatus includes one or more processors. The one or more processors are configured to support the wireless network device or the user equipment in performing corresponding functions in the foregoing methods, for example, generating first configuration information and/or second configuration information. Further, the communications apparatus includes one or more processors, and may further include one or more memories. The memory is configured to be coupled to the processor. The memory stores necessary programs and/or instructions of the communications apparatus, and may further store data. The one or more memories and the processor may be integrated, or may be disposed separately. This is not limited in this application. When the programs and/or the instructions are executed by the processor, the communications apparatus performs the corresponding functions of the wireless network device or the user equipment in the foregoing methods.

In one embodiment, the communications apparatus includes one or more processors and a transceiver unit. The one or more processors are configured to support the wireless network device or the user equipment in performing corresponding functions in the foregoing methods, for example, generating first configuration information and/or second configuration information. The transceiver unit is configured to support the wireless network device or the user equipment in communicating with another device, to implement a receiving/sending function, for example, sending the first configuration information and/or the second configuration information that are/is generated by the processor, or sending radio resource control (RRC) signaling or MAC CE signaling.

In one embodiment, the communications apparatus may further include one or more memories. The memory is configured to be coupled to the processor. The memory stores necessary program instructions and data of the communications apparatus. The one or more memories and the processor may be integrated, or may be disposed separately. This is not limited in this application.

The communications apparatus may be a base station, a transmitting and receiving point (TRP), or user equipment (or may be a terminal device), and the transceiver unit may be a transceiver or a transceiver circuit, or the transceiver unit may be an input/output circuit or an interface.

In one embodiment, the communications apparatus may be a communications chip, and the transceiver unit may be an input/output circuit or an interface of the communications chip.

The one or more processors may be disposed together, or may be disposed separately. The one or more memories may be disposed together, or may be disposed separately. This is not limited herein.

For ease of understanding, descriptions of some concepts related to the present invention are provided as examples for reference. Details are as follows:

The 3rd Generation Partnership Project (3GPP) is a project dedicated to development of a wireless communications network. An organization related to 3GPP is usually referred to as a 3GPP organization.

The wireless communications network is a network that provides a wireless communication function. The wireless communications network may use different communications technologies, such as Code Division Multiple Access (CDMA), Wideband Code Division Multiple Access (WCDMA), Time Division Multiple Access (TDMA), Frequency Division Multiple Access (FDMA), orthogonal frequency-division multiple access (OFDMA), single carrier frequency division multiple access (SC-FDMA), and carrier sense multiple access with collision avoidance (CSMA-CA). Based on factors such as capacities, rates, and delays of different networks, networks may be classified into a 2G network, a 3G network, a 4G network, and a future evolved network such as a 5G network. A typical 2G network includes a Global System for Mobile Communications (GSM) network or a general packet radio service (GPRS) network. A typical 3G network includes a Universal Mobile Telecommunications System (UMTS) network. A typical 4G network includes a Long Term Evolution (LTE) network. The UMTS network sometimes may also be referred to as a universal terrestrial radio access network (UTRAN). The LTE network sometimes may also be referred to as an evolved universal terrestrial radio access network (E-UTRAN). Based on different resource allocation manners, networks may be classified into a cellular communications network and a wireless local area network (WLAN). The cellular communications network is based on scheduling, and the WLAN is based on contention. All the foregoing 2G, 3G, and 4G networks are cellular communications networks. A person skilled in the art should know that, with development of technologies, the technical solutions provided in the embodiments of the present invention may also be applied to another wireless communications network such as a 4.5G or 5G network, or another non-cellular communications network. For brevity, the wireless communications network sometimes is referred to as a network for short in the embodiments of the present invention.

The cellular communications network is a type of wireless communications network, and uses a cellular wireless networking manner to connect a terminal device and a network device by using a radio channel to implement mutual communication between users during movement. The cellular communications network mainly features in terminal mobility, and has functions of an inter-cell handover and automatic roaming across a local network.

FDD represents frequency division duplex.

TDD represents time division duplex.

User equipment (UE) is a terminal device, and may be a movable terminal device or an immovable terminal device. The device is mainly configured to receive or send service data. User equipment may be distributed in a network. The user equipment in different networks has different names, such as a terminal, a mobile station, a subscriber unit, a station, a cellular phone, a personal digital assistant, a wireless modem, a wireless communications device, a handheld device, a laptop computer, a cordless telephone set, and a wireless local loop station. The user equipment may communicate with one or more core networks by using a radio access network (RAN) (an access part of a wireless communications network), for example, to exchange voice and/or data with the radio access network.

A base station (BS) device may also be referred to as a base station, and is an apparatus that is deployed in the radio access network to provide a wireless communication function. For example, in a 2G network, a device that provides a base station function includes a base transceiver station (BTS) and a base station controller (BSC). In a 3G network, a device that provides a base station function includes a NodeB (NB) and a radio network controller (RNC). In a 4G network, a device that provides a base station function includes an evolved NodeB (eNB). In a WLAN, a device that provides a base station function is an access point (AP). In future 5G new radio (NR), a device that provides a base station function includes a further evolved NodeB (gNB).

A wireless device is a device that is located in a wireless communications network and that can perform communication wirelessly. The device may be a base station, may be user equipment, or may be another network element.

A network side device is a device located on a network side in a wireless communications network; and may be a network element of an access network, for example, a base station or a controller (if any), may be a network element of a core network, or may be another network element.

New radio (NR) is a new-generation radio access network technology, and may be applied to a future evolved network, for example, a 5G network.

The wireless local area network (WLAN) is a local area network in which a radio wave is used as a data propagation medium and a propagation distance of the radio wave is usually only several decameters.

The access point (AP) is a device that can be connected to both a wireless network and a wired network. The access point can be used as an intermediate point, so that connection and data transmission are performed between a wired network device and a wireless network device.

RRC represents Radio Resource Control.

RRC processes layer-3 information of a control plane between UE and a UTRAN. RRC usually includes at least one of the following functions:

RRC broadcasts information provided by a non-access stratum of a core network. RRC is responsible for broadcasting network system information to the UE, where the system information is usually repeated according to a specific basic rule. RRC is responsible for planning, segmentation, and repetition, and also supports broadcasting of upper-layer information.

RRC associates broadcast information with an access stratum. RRC is responsible for broadcasting network system information to the UE, where the system information is usually repeated according to a specific basic rule. RRC is responsible for planning, segmentation, and repetition.

RRC establishes, reestablishes, maintains, and releases an RRC connection between the UE and the UTRAN. To establish a first signal connection of the UE, a higher layer of the UE requests to establish an RRC connection. An RRC connection establishment process includes several steps: reselection of an available cell, access permission control, and establishment of a layer-2 signal link. RRC connection release is also requested by the higher layer, and is used to remove a final signal connection; or is initiated by a local RRC layer when an RRC link fails. If a connection fails, the UE requests to reestablish an RRC connection. If the RRC connection fails, RRC releases an allocated resource.

An uplink measurement reference signal is a known pilot signal that is sent by user equipment to a network side device for channel estimation or channel sounding. In an LTE system, the uplink measurement reference signal may be an uplink sounding reference signal (SRS).

A zero-power uplink measurement reference signal (zero-power SRS or ZP-SRS) is an uplink measurement reference signal whose transmit power is 0.

A non-zero-power uplink measurement reference signal (non-zero-power SRS or NZP SRS) is an uplink measurement reference signal whose transmit power is not 0.

A zero-power uplink measurement reference signal resource (ZP-SRS resource) includes a time-frequency resource used to send a zero-power uplink measurement reference signal.

A non-zero-power uplink measurement reference signal resource (NZP-SRS resource) includes a time-frequency resource used to send a non-zero-power uplink measurement reference signal.

An uplink measurement reference signal process (SRS) includes one or more zero-power uplink measurement reference signal resources and one or more non-zero-power uplink measurement reference signal resources.

DESCRIPTION OF EMBODIMENTS

Figure 1:
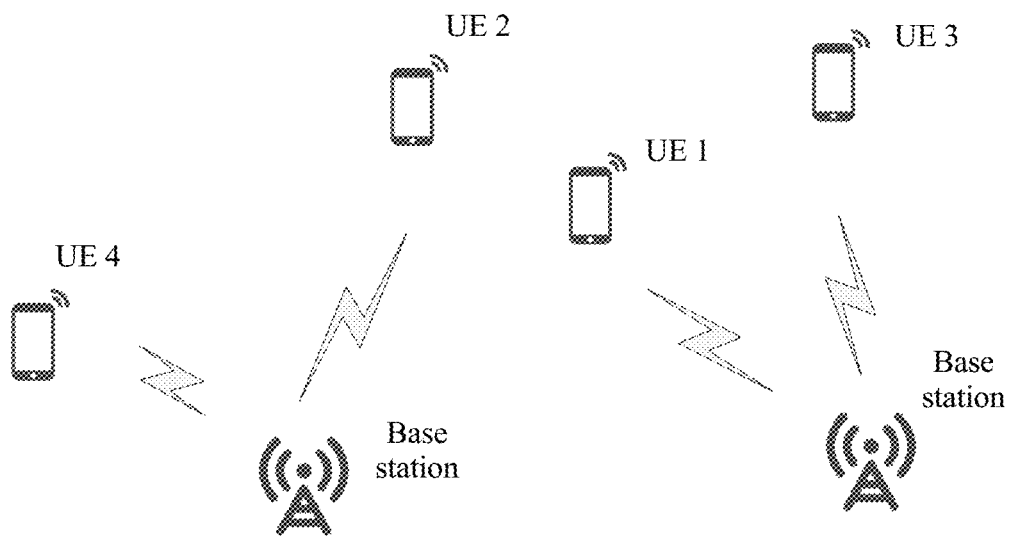
FIG. 1 is a schematic diagram of a communications system (only base stations and UEs are shown)

The following describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

As used in this application, terms such as "component", "module", and "system" are intended to indicate computer-related entities. The computer-related entities may be hardware, firmware, combinations of hardware and software, software, or software in running. For example, a component may be but is not limited to a process that runs on a processor, a processor, an object, an executable file, a thread of execution, a program, and/or a computer. For example, both a computing device and an application that runs on the computing device may be components. One or more components may reside within a process and/or a thread of execution, and the components may be located in one computer and/or distributed between two or more computers. In addition, these components can be executed from various computer-readable media that have various data structures. These components may perform communication by using a local and/or remote process and based on, for example, a signal having one or more data packets (for example, data from one component, where the component interacts with another component in a local system or a distributed system, and/or interacts with another system through a network such as the Internet by using a signal).

In addition, all aspects are described in this application with reference to a wireless device. The wireless device may be a wireless network device, or may be a terminal device. The wireless network device may be a base station. The base station may be configured to communicate with one or more user equipment, or may be configured to communicate with one or more base stations having some user equipment functions (for example, communication between a macro base station and a micro base station such as an access point). Alternatively, the wireless device may be user equipment. The user equipment may be configured to communicate with one or more user equipment (for example, D2D communication), or may be configured to communicate with one or more base stations. The user equipment may also be referred to as a user terminal, and may include some or all of functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone set, a Session Initiation Protocol (SIP) phone, a smartphone, a wireless local loop (WLL) station, a personal digital assistant (PDA), a laptop computer, a handheld communications device, a handheld computing device, a satellite radio device, a wireless modem card, and/or another processing device configured to perform communication in a wireless system. The base station may also be referred to as an access point, a node, a NodeB, an evolved NodeB (eNB), or another network entity, and may include some or all of functions of the foregoing network entities. The base station may communicate with a wireless terminal over an air interface. The communication may be performed by using one or more sectors. The base station may convert a received air interface frame into an IP packet, to serve as a router between the wireless terminal and a remaining part of an access network. The access network includes an Internet Protocol (IP) network. The base station may further coordinate air interface attribute management, and may further be a gateway between a wired network and a wireless network. For example, the base station may be an evolved NodeB (eNB), a radio network controller (RNC), a NodeB (NB), a base station controller (BSC), a base transceiver station (BTS), a home base station (a home evolved NodeB or HNB), a baseband unit (BBU), Wireless Fidelity (WIFI), an access point (AP), a transmission point (TP), a transmission and receiver point (TRP) or the like; or may be a gNB, a transmission point (TP), or a transmitting and receiving point (TRP) in a 5G system such as an NR (new radio) system; or may be a network node used as a gNB or a transmission point, for example, a baseband unit (BBU) or a data unit (DU). In some deployments, the gNB may include a control unit (CU) and a DU. The gNB may further include a radio unit (RU). The CU implements some functions of the gNB, and the DU implements some functions of the gNB. For example, the CU implements functions of an RRC (Radio Resource Control) layer and a PDCP (packet data convergence protocol) layer, and the DU implements functions of an RLC (Radio Link Control) layer, a MAC (Media Access Control) layer, and a PHY (physical) layer. RRC layer information eventually becomes PHY layer information, or is converted from PHY layer information. Therefore, in this architecture, it may alternatively be considered that higher layer signaling, for example, RRC layer signaling or PDCP layer signaling, is sent by the DU or sent by the DU and the RU.

All aspects, embodiments, or features are presented in this application by describing a system that can include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be further used.

In addition, the term "example" in the embodiments of the present invention is used to represent "giving an example, an illustration, or a description". Any embodiment or design scheme described as an "example" in this application should not be explained as being more preferred or having more advantages than another embodiment or design scheme. Rather, the term "example" is used to present a concept in a specific manner.

In the embodiments of the present invention, information, a signal, a message, and a channel sometimes may be interchangeably used. It should be noted that meanings expressed by these terms are consistent when no differences are emphasized between these terms. "Of", "relevant", and "corresponding" sometimes may be interchangeably used. It should be noted that meanings expressed by these terms are consistent when no differences are emphasized between these terms.

In the embodiments of the present invention, for example, sometimes $W_1$ in a subscript form may be mistakenly written as W1 in a non-subscript form. Meanings expressed by these terms are consistent when no differences are emphasized between these terms.

Network architectures and service scenarios that are described in the embodiments of the present invention are intended to more clearly describe the technical solutions in the embodiments of the present invention, but do not constitute any limitation on the technical solutions provided in the embodiments of the present invention. A person of ordinary skill in the art may know that as the network architectures evolve and new service scenarios emerge, the technical solutions provided in the embodiments of the present invention are also applicable to a similar technical issue.

The embodiments of the present invention may be applied to both a time division duplex (TDD) scenario and a frequency division duplex (FDD) scenario.

As described in the background, in a cell, a time-frequency-code resource used by each UE to send an uplink measurement reference signal, for example, an SRS, is configured by a base station. For UEs located on cell edges, because adjacent base stations separately perform configuration, different UEs in two neighboring cells may send uplink measurement reference signals on a same time-frequency-code resource. This causes interference between uplink measurement reference signals of UEs located on the cell edges, and further affects channel sounding quality of the UEs located on the cell edges.

In a future UE-centric (UE-centric) network, a non-cell network architecture is introduced. To be specific, a large quantity of small cells are deployed in a specific area, to form a hyper cell. Each small cell is a transmission point (TP) in the hyper cell and is connected to one centralized controller.

In a UE-centric system, UE needs to periodically send an uplink measurement reference signal. After receiving the reference signal sent by the UE, a network side device may select an optimal TP set (e.g., sub-cluster) for the UE to serve the UE. When the UE moves in the hyper cell, the network side device selects, in real time, a new sub-cluster for the UE to serve the UE, to avoid a real cell handover, thereby implementing service continuity of the UE. In this scenario, because an uplink measurement reference signal resource is limited, relatively serious mutual interference may occur between uplink measurement reference signals, for example, SRSs, sent by a plurality of UEs. The network side device includes a wireless network device.

In view of this, embodiments of the present invention provide an uplink measurement reference signal transmission method, so that interference between uplink measurement reference signals sent by UEs is measurable, and a network side device can perform power control, uplink measurement reference signal reconfiguration, or interference cancellation based on the measured interference, thereby reducing interference between uplink measurement reference signals of UEs located on cell edges.

In embodiments of the present invention, a scenario of a 4G network in wireless communications networks is used as an example for description. It should be noted that the solutions in the embodiments of the present invention may also be applied to another wireless communications network, and a corresponding name may also be replaced with a name of a corresponding function in the other wireless communications network.

It should be noted that the method and the apparatus in embodiments of the present invention may be applied between a base station and user equipment, may be applied between base stations (for example, between a macro base station and a micro base station), or may be applied between user equipment (for example, in a D2D scenario). In all of the embodiments of the present invention, communication between a base station and UE is used as an example for description.

FIG. 1 is a schematic structural diagram of a communications system. The communications system may include a core network, an access network, and a terminal. FIG. 1 shows only wireless network devices included in the access network, for example, base stations and terminals such as user equipment.

Figure 2:
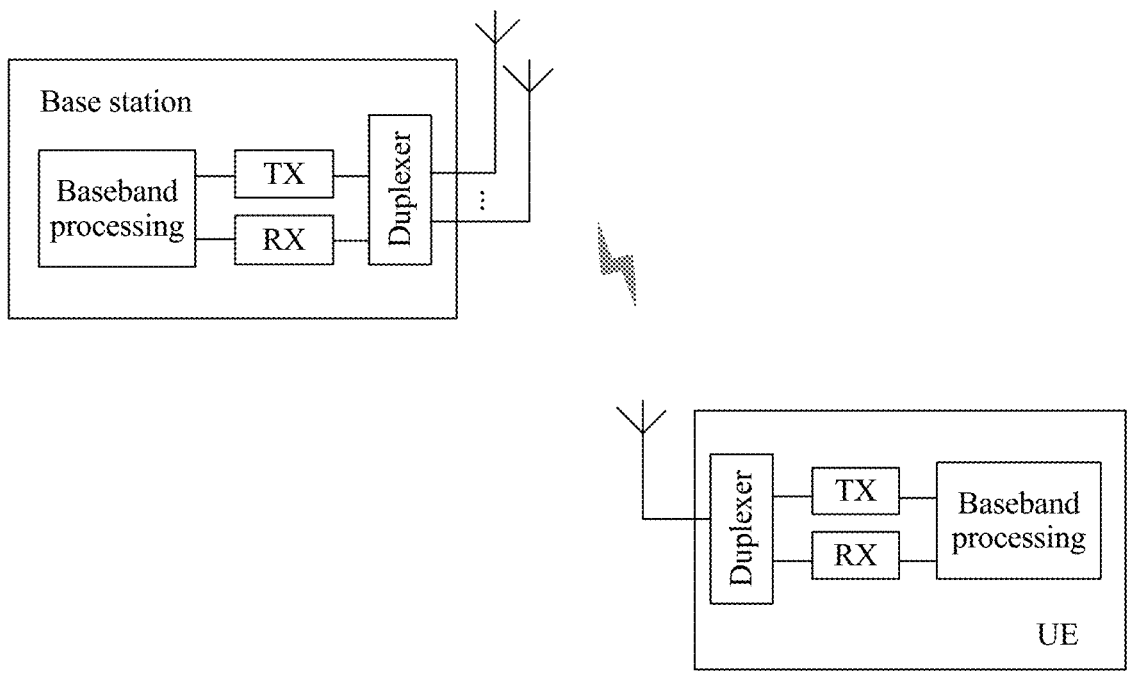
FIG. 2 is simplified schematic diagrams of internal structures of a base station and UE.

FIG. 2 is simplified schematic diagrams of internal structures of a base station and UE.

For example, the base station may include an antenna array, a duplexer, a transmitter (TX), a receiver (RX) (sometimes the TX and the RX are collectively referred to as a transceiver TRX), and a baseband processing part. The duplexer is configured to assist the antenna array in implementing both signal sending and signal receiving. The TX is configured to implement conversion between a radio frequency signal and a baseband signal, and the TX may usually include a power amplifier (PA), a digital-to-analog converter (DAC), and a frequency converter. The RX may usually include a low noise amplifier (LNA), an analog-to-digital converter (ADC), and a frequency converter. The baseband processing part is configured to: process a to-be-sent signal or a received signal, for example, perform layer mapping, precoding, modulation/demodulation, and coding/decoding; and separately process a physical control channel, a physical data channel, a physical broadcast channel, a reference signal, and the like.

In an example, the base station may further include a control part, configured to perform multi-user scheduling, resource allocation, pilot scheduling, user physical layer parameter configuration, and the like.

For example, the UE may include an antenna, a duplexer, a transmitter (TX), a receiver (RX) (sometimes the TX and the RX are collectively referred to as a transceiver TRX), and a baseband processing part. In FIG. 2, the UE has a single antenna. It may be understood that the UE may alternatively have a plurality of antennas (e.g., an antenna array).

The duplexer is configured to assist the antenna array in implementing both signal sending and signal receiving. The TX is configured to implement conversion between a radio frequency signal and a baseband signal, and the TX may usually include a power amplifier (PA), a digital-to-analog converter (DAC), and a frequency converter. The RX may usually include a low noise amplifier (LNA), an analog-to-digital converter (ADC), and a frequency converter. The baseband processing part is configured to: process a to-be-sent signal or a received signal, for example, perform layer mapping, precoding, modulation/demodulation, and coding/decoding; and separately process a physical control channel, a physical data channel, a physical broadcast channel, a reference signal, and the like.

In an example, the UE may further include a control part, configured to: request an uplink physical resource, calculate channel state information (CSI) corresponding to a downlink channel, determine whether a downlink data packet is successfully received, and the like.

Figure 3A:
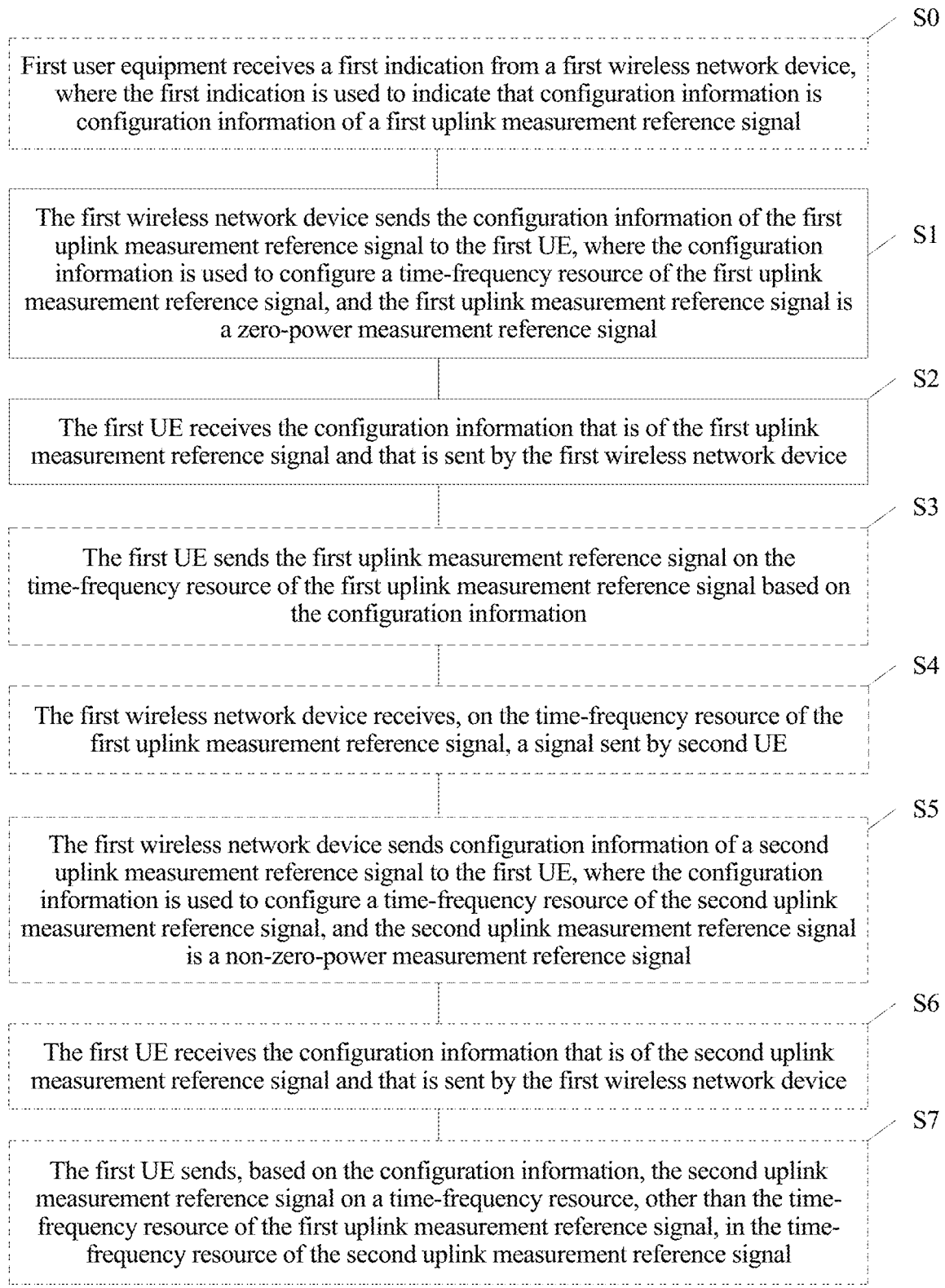
FIG. 3a is a schematic flowchart of an uplink reference signal transmission method according to an embodiment of the present invention.

FIG. 3a is a flowchart of an uplink measurement reference signal transmission method according to an embodiment of the present invention. As shown in FIG. 3a, the method includes the following operations.

Operation S 1. A first wireless network device sends configuration information of a first uplink measurement reference signal to first UE, where the configuration information is used to configure a time-frequency resource of the first uplink measurement reference signal, and the first uplink measurement reference signal is a zero-power measurement reference signal.

The first UE may be UE served by the first wireless network device, and the configuration information is user equipment-specific (UE-specific).

In one embodiment, the configuration information may be carried in higher layer signaling, for example, Radio Resource Control (RRC) signaling.

In one embodiment, the configuration information may include time-frequency resource information of the first uplink measurement reference signal.

In one embodiment, the configuration information may be further used to configure other related information of the first uplink measurement reference signal, for example, one or more pieces of information such as a cycle time, a frequency comb, an antenna port, a bandwidth, a frequency hopping bandwidth, a cyclic shift, a symbol quantity, a subcarrier spacing, a cyclic prefix (CP) length (also referred to as a CP type), and a time domain length (for example, one symbol, a half symbol, x ms, or y μs, where x and y are positive numbers). In an NR system, in consideration of a symbol length difference between different subcarrier spacings, for the first uplink measurement reference signal, for example, a ZP-SRS, the time domain length of the first uplink measurement reference signal may be further defined or configured in addition to defining the subcarrier spacing of the first uplink measurement reference signal.

In one embodiment, a candidate set of the configuration information of the first uplink measurement reference signal during periodic transmission of the first uplink measurement reference signal may be different from that during aperiodic transmission of the first uplink measurement reference signal, and/or a type of the configuration information of the first uplink measurement reference signal during periodic transmission of the first uplink measurement reference signal is different from that during aperiodic transmission of the first uplink measurement reference signal. The difference includes a partial or total difference, and may further include a difference in a quantity of types included in the configuration information. Specifically, a candidate set of the other related information in the configuration information of the first uplink measurement reference signal during periodic transmission of the first uplink measurement reference signal may be different from that during aperiodic transmission of the first uplink measurement reference signal, and/or a type included in the other related information in the configuration information of the first uplink measurement reference signal during periodic transmission of the first uplink measurement reference signal is different from that during aperiodic transmission of the first uplink measurement reference signal. The candidate set is a set that includes a configurable candidate value in the configuration information of the first uplink measurement reference signal. For example, a candidate set of a frequency domain comb may be {2, 4}, {2}, or {1, 2}. The candidate set of the other related information of the first uplink measurement reference signal is a set that includes one type of configurable candidate value as follows: the cycle time, the frequency comb, the antenna port, the bandwidth, the frequency hopping bandwidth, the cyclic shift, the symbol quantity, the subcarrier spacing, the CP length, and the time domain length. The type of the other related information of the first uplink measurement reference signal includes at least one of the following: the cycle time, the frequency comb, the antenna port, the bandwidth, the frequency hopping bandwidth, the cyclic shift, the symbol quantity, the subcarrier spacing, the CP length, and the time domain length. In the foregoing method, overheads of the configuration information during periodic transmission can be different from overheads of the configuration information during aperiodic transmission. Specifically, a quantity of candidate sets and/or a quantity of types of the other related information of the first uplink measurement reference signal in the configuration information during aperiodic transmission of the first uplink measurement reference signal are/is less than a quantity of candidate sets and/or a quantity of types of the other related information of the first uplink measurement reference signal in the configuration information during periodic transmission of the first uplink measurement reference signal. This can reduce the configuration information during aperiodic transmission, and reduce overheads during aperiodic transmission. In particular, when the configuration information is transmitted in DCI during aperiodic transmission, overheads of the DCI can be reduced.

For example, when the first uplink measurement reference signal is subject to periodic transmission, there may be two or four candidate frequency combs, for example, {0, 1} or {0, 1, 2, 3}. A comb quantity corresponding to {0, 1} is 2. 0 and 1 are identifiers or indexes of the two combs, and a difference between adjacent subcarriers corresponding to the two combs is two subcarrier spacings. A comb quantity corresponding to {0, 1, 2, 3} is 4. 0 to 3 are identifiers or indexes of the four combs, and a difference between adjacent subcarriers corresponding to the combs is four subcarrier spacings. When the uplink measurement reference signal is subject to aperiodic transmission, there may be only two candidate frequency domain combs, for example, as described in the foregoing case of {0, 1}; or there may be no candidate frequency domain comb, for example, the comb is specified by a protocol, locally preconfigured, or pre-stored, without being configured by the network device by using a message. Such a comb specified by the protocol may be corresponding to all subcarriers (that is, there is no comb). In other words, a difference between adjacent subcarriers is one subcarrier.

For another example, when the first uplink measurement reference signal is subject to periodic transmission, one or more of pieces of information such as the cycle time, the frequency comb, the antenna port, the bandwidth, the frequency hopping bandwidth, and the cyclic shift may be configured. When the first uplink measurement reference signal is subject to aperiodic transmission, one or more of pieces of information such as the cycle time, the frequency comb, the bandwidth, the frequency hopping bandwidth, and the cyclic shift may not be configured. Specifically, due to aperiodic transmission, the cycle time and the cyclic shift may not be required. When the bandwidth and/or the hopping bandwidth are/is not configured, the bandwidth of the first uplink measurement reference signal may be one of the following: a transmission bandwidth of a scheduled uplink data channel (for example, a physical uplink shared channel (PUSCH)) of the UE, a bandwidth of a second uplink measurement reference signal, or a bandwidth of a configured bandwidth part (BWP) of the UE. The BWP is a bandwidth that is configured by a base station and that can be used by the UE for uplink PUSCH transmission. A specific bandwidth may be specified by a protocol. The transmission bandwidth of the scheduled PUSCH of the UE may be a subset of the configured BWP of the UE. When the frequency domain comb is not configured, as described in the foregoing example, it is predefined that the first uplink measurement reference signal occupies each subcarrier within the bandwidth of the first uplink measurement reference signal. For configuration for the aperiodic first uplink measurement reference signal, overheads of configuration signaling can be reduced by reducing configured items. For example, for a slot in which four symbols are configured and that can be used to transmit the first uplink measurement reference signal, if none of the cycle time, the frequency comb, the antenna port, the bandwidth, the frequency hopping bandwidth, and the cyclic shift is configured, only symbols may be configured. In this case, 4 bits may be used to configure whether the four symbols are used to map the first uplink measurement reference signal (that is, in a bitmap manner), and overheads are relatively low. In addition, for configuration for the aperiodic first uplink measurement reference signal, a time interval between the first uplink measurement reference signal and configuration signaling may be further configured. For example, the time interval may be N time domain units (which may also be referred to as time domain resource units), N is an integer greater than or equal to 0, and the time interval is used to indicate an interval between a time domain unit in which the first uplink measurement reference signal is located and a time domain unit in which a channel through which the configuration signaling is transmitted is located. The time domain unit may be a slot, a symbol, a mini-slot, or a subframe. Optionally, N may be specified by a protocol, or configured by the network device.

In one embodiment, the aperiodic first uplink measurement reference signal or the first uplink measurement reference signal triggered by using DCI occupies all subcarriers within the bandwidth of the first uplink measurement reference signal in a symbol to which the first uplink measurement reference signal is mapped.

In one embodiment, when the aperiodic first uplink measurement reference signal is triggered by using DCI, the base station may first configure a plurality of candidate configurations of the first uplink measurement reference signal (also referred to as a plurality of pieces of configuration information of the first uplink measurement reference signal) by using higher layer signaling, for example, RRC signaling or Media Access Control control element (MAC CE) signaling, and then one or more of the configurations of the first uplink measurement reference signal are triggered by using the DCI. A specific triggering method may be as follows: A field that is in the DCI and that is used to trigger a candidate configuration of the first uplink measurement reference signal is added to an element corresponding to the candidate configuration of the first uplink measurement reference signal. Each element may correspond to one candidate configuration of the first uplink measurement reference signal, and is used to indicate whether the corresponding candidate configuration of the first uplink measurement reference signal is triggered. Each element may include one or more bits. This is not limited herein. In one embodiment, the base station may configure one or more candidate configuration groups of the first uplink measurement reference signal by using higher layer signaling, for example, RRC signaling or MAC CE signaling, and one or more of the groups are triggered by using the DCI.

In this way, the base station can trigger a plurality of configurations of the first uplink measurement reference signal more efficiently.

A correspondence between a candidate configuration group of the first uplink measurement reference signal and the field that is in the DCI and that is used to trigger a candidate configuration of the first uplink measurement reference signal may be embodied as a list (list), a formula, a string of characters, an array, or a segment of code. The correspondence may be specified by a protocol, locally preconfigured, or pre-stored. For example, the correspondence is in a form of a list. A specific example is described in Table 1. The base station instructs, by using the field that is in the DCI and that is used to trigger a candidate configuration of the first uplink measurement reference signal, to trigger a candidate configuration group of the first uplink measurement reference signal. For example, the base station instructs, by using a field "00" that is in the DCI and that is used to trigger a candidate configuration of the first uplink measurement reference signal, to trigger a candidate configuration group 0 of the first uplink measurement reference signal. It may be understood that a value in the field in Table 1 is a binary numeral, or may be represented by a decimal, octal, or hexadecimal numeral. Alternatively, the value in the field that is in the DCI and that is used to trigger a candidate configuration of the first uplink measurement reference signal may not be limited to 0 to 3 in Table 1, and other values may be used. This is not limited herein.

TABLE 1

| Field that is in the DCI and that is used to trigger a candidate configuration of the first uplink measurement reference signal | Candidate configuration group of the first uplink measurement reference signal |
|---|---|
| 00 | Candidate configuration group 0 of the first uplink measurement reference signal |
| 01 | Candidate configuration group 1 of the first uplink measurement reference signal |
| 10 | Candidate configuration group 2 of the first uplink measurement reference signal |
| 11 | Candidate configuration group 3 of the first uplink measurement reference signal |

The candidate configuration group of the first uplink measurement reference signal may include one or more candidate configurations of the first uplink reference signal. The candidate configuration group of the first uplink measurement reference signal and the one or more candidate configurations of the first uplink reference signal that correspond to the candidate configuration group of the first uplink measurement reference signal are embodied in a form of a list (list), a formula, a string of characters, an array, a segment of code, or the like. The correspondence may be specified by a protocol, locally preconfigured, or pre-stored; or the correspondence may be configured by the base station. For example, a correspondence between a candidate configuration group of the first uplink measurement reference signal and a candidate configuration of the first uplink reference signal is described in Table 2.

TABLE 2

| Candidate configuration group of the first uplink measurement reference signal | Candidate configuration of the first uplink measurement reference signal |
|---|---|
| Candidate configuration group 0 of the first uplink measurement reference signal | Candidate configurations {0, 1} of the first uplink measurement reference signal |
| Candidate configuration group 1 of the first uplink measurement reference signal | Candidate configurations {0, 2} of the first uplink measurement reference signal |
| Candidate configuration group 2 of the first uplink measurement reference signal | Candidate configuration {2} of the first uplink measurement reference signal |
| Candidate configuration group 3 of the first uplink measurement reference signal | Candidate configurations {0, 1, 2, 3} of the first uplink measurement reference signal |

0 to 3 each are an identifier or index of a candidate configuration or configuration group of the first uplink measurement reference signal. This is only an example herein, and other values may alternatively be used. This is not limited herein.

In one embodiment, in this application, one configuration of the first uplink measurement reference signal may correspond to one resource of the first uplink measurement reference signal. For example, in the foregoing embodiment, the candidate configuration group of the first uplink measurement reference signal may be a resource group of the first uplink measurement reference signal, and the candidate configuration of the first uplink measurement reference signal may be a resource of the first uplink measurement reference signal.

It may be understood that, a plurality of specific designs related to the first uplink measurement reference signal in this application include but are not limited to the foregoing plurality of designs related to configuration and triggering; and may be separately applied (decoupled), or may be decoupled from specific designs of the second uplink measurement reference signal, or may be combined with each other. This does not affect application or implementation of this application.

Operation S2. The first UE receives the configuration information that is of the first uplink measurement reference signal and that is sent by the first wireless network device.

In one embodiment, the method may further include S3: The first UE sends the first uplink measurement reference signal on the time-frequency resource of the first uplink measurement reference signal based on the configuration information.

The time-frequency resource that is of the first uplink measurement reference signal and that is configured by using the configuration information of the first uplink measurement reference signal in operation S1 may be a subset of a time-frequency resource of a non-zero-power uplink measurement reference signal of the first UE.

It may be understood that herein, the first UE may send the first uplink measurement reference signal in a plurality of manners. For example, two manners may be as follows: 1. The first UE sends a zero-power uplink measurement reference signal. 2. The first UE does not send a non-zero-power uplink measurement reference signal.

The first wireless network device sends configuration information of the zero-power uplink measurement reference signal to the first UE, so that the first UE may be silent (in other words, the first UE does not send the non-zero-power uplink measurement reference signal, or sends the zero-power uplink measurement reference signal) on some time-frequency resources of the non-zero-power uplink measurement reference signal. In this way, the first wireless network device can measure, on a time-frequency resource of the zero-power uplink measurement reference signal, a signal (which may also be referred to as an interference signal) of another UE on the time-frequency resource, so that the first wireless network device can perform power control, resource reconfiguration, or interference cancellation based on a measurement result, thereby reducing interference caused to the non-zero-power uplink measurement reference signal of the first UE, and improving channel state estimation accuracy.

Further, the method may further include:

Operation S4. The first wireless network device receives, on the time-frequency resource of the first uplink measurement reference signal, a signal sent by second UE.

The signal may be a third uplink measurement reference signal, and the third uplink measurement reference signal is a non-zero-power measurement reference signal. Alternatively, the signal may be data (for example, when the second UE is UE served by a wireless network device adjacent to the first wireless network device).

The second UE may be UE served by the first wireless network device, or may be UE served by the wireless network device adjacent to the first wireless network device.

It may be understood that, when the second UE is UE served by the first wireless network device, the first wireless network device may also configure, for the second UE, a time-frequency resource and sequence information for sending the third uplink measurement reference signal by the second UE. In one embodiment, a sequence of the third uplink measurement reference signal is orthogonal to a sequence of the second uplink measurement reference signal of the first UE.

When the second UE is UE served by the wireless network device adjacent to the first wireless network device, for example, served by a second wireless network device, the second wireless network device may also configure, for the second UE, a time-frequency resource and sequence information for sending the third uplink measurement reference signal by the second UE.

In one embodiment, configuring, by the second wireless network device for the second UE, the time-frequency resource and the sequence information for sending the third uplink measurement reference signal by the second UE may be independent of configuring, by the first wireless network device for the first UE, a time-frequency resource and sequence information for sending the second uplink measurement reference signal by the first UE.

In one embodiment, before or after the second wireless network device configures, for the second UE, the time-frequency resource and the sequence information for sending the third uplink measurement reference signal by the second UE, the second wireless network device may exchange information with the first wireless network device, so that configuration of the third uplink measurement reference signal and configuration of the second uplink measurement reference signal may cooperate with each other. For example, the sequence of the third uplink measurement reference signal is enabled to be orthogonal to the sequence of the second uplink measurement reference signal. For another example, a power of the third uplink measurement reference signal and a power of the second uplink measurement reference signal may be correspondingly adjusted, so that mutual interference between the third uplink measurement reference signal and the second uplink measurement reference signal can be reduced.

Further, the method may further include:

Operation S5. The first wireless network device sends configuration information of a second uplink measurement reference signal to the first UE, where the configuration information is used to configure a time-frequency resource of the second uplink measurement reference signal, and the second uplink measurement reference signal is a non-zero-power measurement reference signal.

In one embodiment, the configuration information is carried in higher layer signaling, for example, RRC signaling.

In one embodiment, the configuration information may include time-frequency resource information of the second uplink measurement reference signal.

Operation S6. The first UE receives the configuration information that is of the second uplink measurement reference signal and that is sent by the first wireless network device.

Operation S7. The first UE sends, based on the configuration information, the second uplink measurement reference signal on a time-frequency resource, other than the time-frequency resource of the first uplink measurement reference signal, in the time-frequency resource of the second uplink measurement reference signal.

The time-frequency resource of the first uplink measurement reference signal is a subset of the time-frequency resource of the second uplink measurement reference signal.

To be specific, when the first uplink measurement reference signal needs to be sent, the second uplink measurement reference signal that originally needs to be sent on the time-frequency resource of the first uplink measurement reference signal is not to be sent.

In one embodiment, when the user equipment sends an uplink channel, the uplink channel is mapped to a time-frequency resource other than the time-frequency resource of the first uplink measurement reference signal, or the uplink channel is not mapped to the time-frequency resource of the first uplink measurement reference signal. The uplink channel may be an uplink data channel, for example, a physical uplink shared channel (PUSCH); and/or an uplink control channel, for example, a physical uplink control channel (PUCCH). When the uplink channel is the PUSCH, the user equipment does not map the PUSCH to the time-frequency resource of the first uplink measurement reference signal, or maps the PUSCH to a resource other than the time-frequency resource of the first uplink measurement reference signal, or maps the PUSCH to a resource that is not used to transmit the first uplink measurement reference signal. The user needs to perform rate matching based on a time-frequency resource to which the PUSCH can be mapped. When the uplink channel is the PUCCH, the user equipment does not map the PUCCH to the time-frequency resource of the first uplink measurement reference signal, or maps the PUCCH to a resource other than the time-frequency resource of the first uplink measurement reference signal, or maps the PUCCH to a resource that is not used to transmit the first uplink measurement reference signal. The user equipment needs to perform rate matching based on a time-frequency resource to which the PUCCH can be mapped. Alternatively, the user equipment does not send the first uplink measurement reference signal on a resource of the PUCCH, or maps the first uplink measurement reference signal to the time-frequency resource of the first uplink measurement reference signal other than the resource of the PUCCH. In one embodiment, for a non-zero-power uplink measurement reference signal, for example, the second uplink measurement reference signal, a mapping method of the second uplink measurement reference signal, and/or the PUSCH and/or the PUCCH may be determined according to the foregoing mapping method of the first uplink measurement reference signal, and the PUSCH and/or the PUCCH.

In one embodiment, the resource of the first uplink measurement reference signal may alternatively be some or all of rate matching resources (rate matching resource, RMR), or some or all of uplink RMRs. A time resource, the cycle time, the frequency comb, the bandwidth, the frequency hopping bandwidth, the symbol quantity, the subcarrier spacing, the CP length, and the time domain length in the configuration information of the first uplink measurement reference signal may also be understood as configuration information of the resource of the first uplink measurement reference signal.

In one embodiment, in the configuration information, frequency comb information and sequence information (which may also be referred to as code information) of the first uplink measurement reference signal may be the same as those of the second uplink measurement reference signal.

In one embodiment, when the first uplink measurement reference signal is subject to periodic transmission, in the configuration information, the cycle time of the first uplink measurement reference signal is longer than a cycle time of the second uplink measurement reference signal.

It may be understood that, neither a time relationship between operation S5 and any operations in S1 to S4 nor a time relationship between operation S6 and any operations in S1 to S4 may be limited, provided that operation S6 is performed after operation S5.

Further, the method may further include:

obtaining, by the first wireless network device, the sequence information of the third uplink measurement reference signal that is sent by the second UE and that is received on the time-frequency resource of the first uplink measurement reference signal, and determining, based on the sequence information, whether the third uplink measurement reference signal causes interference to the second uplink measurement reference signal sent by the first UE.

In one embodiment, determining, based on the sequence information, whether the third uplink measurement reference signal causes interference to the second uplink measurement reference signal sent by the first UE includes:

determining, based on whether the sequence of the third uplink measurement reference signal is orthogonal to the sequence of the second uplink measurement reference signal, whether the third uplink measurement reference signal causes interference to the second uplink measurement reference signal.

Specifically, when the sequence of the third uplink measurement reference signal is not orthogonal to the sequence of the second uplink measurement reference signal, it is determined that the third uplink measurement reference signal causes interference to the second uplink measurement reference signal.

When the sequence of the third uplink measurement reference signal is orthogonal to the sequence of the second uplink measurement reference signal, it is determined that the third uplink measurement reference signal causes no interference to the second uplink measurement reference signal.

In this way, the first network device can obtain an interference status through measurement in a power dimension, and can further determine, in a sequence dimension, whether the third uplink measurement reference signal causes interference to the second uplink measurement reference signal, to further improve interference measurement accuracy.

In one embodiment, the method may further include:

Operation S0. The first user equipment receives a first indication from the first wireless network device, where the first indication is used to indicate that configuration information is the configuration information of the first uplink measurement reference signal.

The first indication is used, so that signaling (a message) can be multiplexed for the configuration information of the first uplink measurement reference signal and the configuration information of the second uplink measurement reference signal, and further the first UE can correctly parse the received configuration information. It may be understood that, if there is no explicit first indication, the first UE may determine, based on a format of the configuration information or information about an occupied resource (for example, at least one of a time domain resource and a frequency domain resource) or in another implicit indication manner, that the configuration information is the configuration information of the first uplink measurement reference signal.

In one embodiment, the first indication may be transmitted independently of the configuration information, or may be carried in the configuration information for transmission.

The first indication may be a user equipment-specific (UE-specific) parameter.

In one embodiment, the first indication may also be referred to as a type indication. To be specific, the first indication indicates that an uplink measurement reference signal for which configuration is performed by using the configuration information is a zero-power measurement reference signal or a non-zero-power measurement reference signal.

In one embodiment, the first indication may be used to indicate whether the configuration information is the configuration information of the first uplink measurement reference signal or the configuration information of the second uplink measurement reference signal. In one embodiment, the first indication may occupy 1 bit. For example, when the first indication is 0, it indicates that the configuration information is the configuration information of the first uplink measurement reference signal; or when the first indication is 1, it indicates that the configuration information is the configuration information of the second uplink measurement reference signal.

In one embodiment, it may be determined, based on whether there is a first indication, whether the configuration information is the configuration information of the first uplink measurement reference signal or the configuration information of the second uplink measurement reference signal. For example, if there is a first indication, it indicates that the configuration information is the configuration information of the first uplink measurement reference signal; or if there is no first indication, it indicates that the configuration information is the configuration information of the second uplink measurement reference signal.

It may be understood that, before operation S5, the method may further include:

receiving, by the first user equipment, the first indication from the first wireless network device, where the first indication is used to indicate that the configuration information is the configuration information of the second uplink measurement reference signal.

For related descriptions of the first indication, refer to the descriptions in the foregoing operation S0. Details are not described herein again.

In one embodiment, the method may further include:

sending, by the first wireless network device, a second indication to the first UE, where the second indication is used to indicate whether the first uplink measurement reference signal for which configuration is performed by using the configuration information is subject to periodic transmission, aperiodic transmission, or semi-persistent transmission; and receiving, by the first UE, the second indication; and periodically transmitting the first uplink measurement reference signal based on the indication and the configuration information, or aperiodically transmitting the first uplink measurement reference signal based on the indication and the configuration information.

A parameter included in configuration information for periodic transmission and a parameter included in configuration information for aperiodic transmission may be different; or the parameters are the same but have different meanings. Therefore, the first UE can correctly parse the received configuration information by using the second indication. Alternatively, a parameter included in configuration information for periodic transmission, a parameter included in configuration information for aperiodic transmission, and a parameter included in configuration information for semi-persistent transmission may be different; or the parameters are the same but have different meanings. Therefore, the first UE can correctly parse the received configuration information by using the second indication.

In one embodiment, the second indication may be carried in higher layer signaling, for example, RRC signaling.

In one embodiment, when the configuration information of the first uplink measurement reference signal is used for aperiodic transmission, receiving, by the first user equipment, the configuration information of the first uplink measurement reference signal from the first wireless network device includes:

receiving, by the first user equipment, the configuration information of the first uplink measurement reference signal from the first wireless network device, where the configuration information is used to indicate a plurality of groups of time-frequency resources of the first uplink measurement reference signal; and the method further includes: receiving, by the first user equipment, trigger information from the first wireless network device, where the trigger information is used to trigger the first user equipment to send the first uplink measurement reference signal on at least one of the plurality of groups of time-frequency resources.

In one embodiment, the trigger information may include identification information of the at least one of the plurality of groups of time-frequency resources, such as an uplink measurement reference signal identifier, for example, an SRS ID.

In one embodiment, the configuration information may be carried in higher layer signaling, for example, RRC signaling, and the trigger information may be carried in downlink control information (DCI).

In one embodiment, similarly, the method may further include:

sending, by the first wireless network device, a third indication to the first UE, where the third indication is used to indicate whether the second uplink measurement reference signal for which configuration is performed by using the configuration information is subject to periodic transmission, aperiodic transmission, or semi-persistent transmission; and receiving, by the first UE, the third indication; and periodically transmitting the second uplink measurement reference signal based on the indication and the configuration information, or aperiodically transmitting the second uplink measurement reference signal based on the indication and the configuration information.

In one embodiment, the third indication may be carried in higher layer signaling, for example, RRC signaling.

In one embodiment, when the configuration information of the second uplink measurement reference signal is used for aperiodic transmission, receiving, by the first user equipment, the configuration information of the second uplink measurement reference signal from the first wireless network device includes:

receiving, by the first user equipment, the configuration information of the second uplink measurement reference signal from the first wireless network device, where the configuration information is used to indicate a plurality of groups of time-frequency resources of the second uplink measurement reference signal; and receiving, by the first user equipment, trigger information from the first wireless network device, where the trigger information is used to trigger the first user equipment to send the second uplink measurement reference signal on at least one of the plurality of groups of time-frequency resources.

In one embodiment, the trigger information may include identification information of the at least one of the plurality of groups of time-frequency resources.

In one embodiment, the configuration information may be carried in higher layer signaling, for example, RRC signaling, and the trigger information may be carried in downlink control information (DCI).

In one embodiment, the first uplink measurement reference signal and the second uplink measurement reference signal may be included in a same uplink measurement reference signal process.

One uplink measurement reference signal process may include information about one or more resources used to transmit the first uplink measurement reference signal, and/or information about one or more resources used to transmit the second uplink measurement reference signal. The resource information includes one or more pieces of resource information such as time domain resource information, frequency domain resource information, and sequence information. To be specific, the configuration information of the first uplink measurement reference signal may include the information about the one or more resources used to transmit the first uplink measurement reference signal, and the configuration information of the second uplink measurement reference signal may include the information about the one or more resources used to transmit the second uplink measurement reference signal.

In one embodiment, configuration may be separately performed for the first uplink measurement reference signal and the second uplink measurement reference signal. In other words, no concept of the uplink measurement reference signal process is introduced.

In one embodiment, the first UE may be located on an edge of a cell served by the first wireless network device.

In one embodiment, when the second UE is served by the second wireless network device, the second UE may be located on an edge of a cell served by the second wireless network device.

According to the uplink measurement reference signal transmission method provided in this embodiment of the present invention, the wireless network device may measure, on a time-frequency resource of a zero-power uplink measurement reference signal sent by the user equipment, a non-zero-power uplink measurement reference signal (which may also be referred to as interference) sent by another user equipment, and then the wireless network device performs an operation such as power control, uplink measurement reference signal reconfiguration, or interference cancellation based on the measured interference, so that interference caused by a non-zero-power uplink measurement reference signal of the user equipment can be reduced.

In one embodiment, the configuration information may further include one or more of a frequency hopping bandwidth, a symbol quantity, a subcarrier spacing, a CP length, a time domain length, and the like.

For example, if the uplink measurement reference signal is a sounding reference signal (SRS), the zero-power uplink measurement reference signal may be denoted as a ZP SRS (zero-power SRS), and the non-zero-power uplink measurement reference signal may be denoted as an NZP SRS (non-zero-power SRS). Specific configuration information of the first uplink measurement reference signal (namely, the ZP SRS) may be as follows:

```
ZP-SoundingRS-UL-Config::=CHOICE{
    SRS-ConfigZPId-r11    CSI-RS-ConfigZPId-r11
    SRS-AntennaPort-r10   SRS-AntennaPort
    SRS-Bandwidth         ENUMERATED {bw0, bw1,
                          bw2, bw3}
    SRS-HoppingBandwidth  ENUMERATED {hbw0, hbw1,
hbw2, hbw3},
    FreqDomainPosition    INTEGER (0..23),
    Duration              BOOLEAN,
    SRS-ConfigIndex       INTEGER (0..1023),
    TransmissionComb      INTEGER (0..1),
    CyclicShift           ENUMERATED {cs0, cs1, cs2, cs3,
cs4, cs5, cs6, cs7}
    Periodicity           ENUMERATED {T1 T2 T3 T4},
}
```

CSI-RS-ConfigZPId-r11 indicates an ID of a ZP SRS resource corresponding to this group of configuration information; SRS-AntennaPort-r10 indicates a number of an antenna port used by the UE to send the ZP SRS; SRS-Bandwidth indicates a bandwidth of the ZP SRS; SRS-HoppingBandwidth indicates a frequency hopping bandwidth of the ZP SRS, is used for frequency hopping of the ZP SRS, and is usually used for a periodically transmitted ZP SRS; FreqDomainPosition indicates a start location of the ZP SRS in frequency domain; Duration indicates duration of the ZP SRS; SRS-ConfigIndex indicates a configuration index of the ZP SRS; TransmissionComb indicates a value of a comb (also referred to as a frequency comb) used for the ZP SRS; CyclicShift indicates a cyclic shift used for a sequence of the ZP SRS; and Periodicity indicates a cycle time of the ZP SRS.

It may be understood that the foregoing configuration information is an example of configuration information of a periodically transmitted ZP SRS. Depending on an actual system configuration requirement, content included in the configuration information may be in another form, for example, may be one item or a combination of a plurality of items in the various items of information included in the configuration information, and specific values of the various items of information may be different from the values in the foregoing example. This is not limited herein.

Similarly, specific configuration information of the non-zero-power uplink measurement reference signal may be as follows:

```
NZP-SoundingRS-UL-Config::=  CHOICE{
    SRS-ConfigNZPId-r11 CSI-RS-ConfigNZPId-r11
    SRS-AntennaPort-r10  SRS-AntennaPort
    SRS-Bandwidth         ENUMERATED {bw0, bw1, bw2, bw3}
    SRS-HoppingBandwidth  ENUMERATED {hbw0, hbw1,
hbw2, hbw3},
    FreqDomainPosition    INTEGER (0..23),
    Duration              BOOLEAN,
    SRS-ConfigIndex       INTEGER (0..1023),
    TransmissionComb      INTEGER (0..1),
    CyclicShift           ENUMERATED {cs0, cs1, cs2, cs3,
cs4, cs5, cs6, cs7}
    Periodicity           ENUMERATED {T1'T2'T3'T4'},
}
```

CSI-RS-ConfigNZPId-r11 indicates an ID of an NZP SRS resource corresponding to this group of configuration information. The other parameters in the configuration information all indicate corresponding configuration information of the NZP SRS, and specific meanings of these parameters are consistent with those in the configuration information of the ZP SRS.

In a possible configuration manner, an uplink measurement reference signal process, for example, an SRS process, may be defined. The process may include information about one or more zero-power uplink measurement reference signal resources (information about each resource may be corresponding to one identifier (ID)) and/or information about one or more non-zero-power uplink measurement reference signal resources (information about each resource is corresponding to one identifier (ID)).

In one embodiment, information about the uplink measurement reference signal process is carried by using higher layer signaling (for example, RRC signaling).

In one embodiment, the UE learns, based on different IDs of configuration information of a zero-power uplink measurement reference signal and configuration information of a non-zero-power uplink measurement reference signal, whether current configuration information is corresponding to the zero-power uplink measurement reference signal or the non-power uplink measurement reference signal.

For example, for an SRS process, a ZP SRS, and an NZP SRS, one SRS process may be defined as:

```
SRS-process::=SEQUENCE{
    SRS-ProcessId       SRS-ProcessId,
    SRS-ConfigNZPId     SRS-ConfigNZPId,
    SRS-ConfigZPId      SRS-ConfigId,
}
```

SRS-ProcessId indicates an identifier (ID) of the SRS process, SRS-ConfigNZPId indicates an ID of an NZP SRS resource, and SRS-ConfigZPId indicates an ID of a ZP SRS resource.

The ID of the NZP SRS resource is difference from the ID of the ZP SRS resource. The difference may indicate different resources, and may also indicate whether the resources are used for the NZP SRS or used for the ZP SRS.

In one embodiment, when there are a plurality of IDs of NZP SRS resources, the IDs of the NZP SRS resources are further used to identify different NZP SRS resources.

Similarly, when there are a plurality of IDs of ZP SRS resources, the IDs of the ZP SRS resources are further used to identify different ZP SRS resources.

In another possible configuration manner, the uplink measurement reference signal process may not be defined. Instead, configuration is directly performed for a zero-power uplink measurement reference signal and a non-zero-power uplink measurement reference signal. For example, information about one or more zero-power uplink measurement reference signal resources (information about each resource may be corresponding to one identifier (ID)) and/or information about one or more non-zero-power uplink measurement reference signal resources (information about each resource may be corresponding to one identifier (ID)) are/is carried in higher layer signaling.

In one embodiment, identification information that is of the zero-power uplink measurement reference signal and that is included in configuration information, or identification information that is of the non-zero-power uplink measurement reference signal and that is included in the configuration information may be used to determine whether the configuration information is configuration information of the zero-power uplink measurement reference signal or configuration information of the non-zero-power uplink measurement reference signal.

When the configuration information includes a plurality of pieces of resource information, the identification information of the zero-power uplink measurement reference signal may be further used to distinguish between resource information of different zero-power uplink measurement reference signals, and/or the identification information of the non-zero-power uplink measurement reference signal may be further used to distinguish between resource information of different non-zero-power uplink measurement reference signals.

In one embodiment, a type indication (namely, the foregoing first indication) may be further defined, to indicate whether configuration information is configuration information of the zero-power uplink measurement reference signal or configuration information of the non-zero-power uplink measurement reference signal. The type indication may be carried in the configuration information, or may be independently carried in DCI or higher layer signaling.

In a possible implementation, the second indication may be used to indicate whether the zero-power uplink measurement reference signal is subject to periodic transmission or aperiodic transmission.

In a possible implementation, the second indication may be used to indicate whether the zero-power uplink measurement reference signal is subject to periodic transmission, aperiodic transmission, or semi-persistent transmission.

In one embodiment, the second indication may be carried in higher layer signaling.

For example, the second indication may be a trigger type (trigger type) 0 or a trigger type 1. The trigger type 0 indicates a periodically transmitted zero-power uplink measurement reference signal, and the trigger type 1 indicates an aperiodically transmitted zero-power uplink measurement reference signal. Alternatively, the second indication may be a trigger type (trigger type) 0, a trigger type 1, or a trigger type 2. The trigger type 0 indicates a periodically transmitted zero-power uplink measurement reference signal, the trigger type 1 indicates an aperiodically transmitted zero-power uplink measurement reference signal, and the trigger type 2 indicates a semi-persistently transmitted zero-power uplink measurement reference signal. The semi-persistent transmission may be activated through triggering of DCI or a MAC CE, for example, sending of the first or second uplink measurement reference signal is activated, and may be deactivated through triggering of DCI or a MAC CE, for example, the sending of the first or second uplink measurement reference signal is stopped. Alternatively, the semi-persistent transmission may be activated through triggering of DCI or a MAC CE, and deactivated after a period of time. The period of time may be specified by a protocol (without being configured by a base station, or may be locally pre-stored or preconfigured), or may be configured by a base station. Alternatively, the semi-persistent transmission may be activated (for example, activated by using a timer) after configuration information is received for a period of time, and deactivated through triggering of DCI or a MAC CE, or deactivated (for example, deactivated by using a timer) after a period of time. The period of time between a time at which the configuration information is received and a time at which the activation is performed may be specified by a protocol (without being configured by a base station, or may be locally pre-stored or preconfigured), or may be configured by a base station. The period of time between the time at which the activation is performed and a time at which the deactivation is performed may also be specified by the protocol (without being configured by the base station, or may be locally pre-stored or preconfigured), or may be configured by the base station. The foregoing correspondences between the specific trigger types 0 through 2 and the meanings indicated by the specific trigger types 0 through 2 show an example, and a value of the trigger type may alternatively be defined in another manner. This is not limited herein.

In one embodiment, in a case of the trigger type 1, a plurality of groups of time-frequency resource information of the aperiodically transmitted zero-power uplink measurement reference signal may be configured by using higher layer signaling. Because configuration performed by using the higher layer signaling is static or semi-static configuration, an application period of these pieces of configuration information is relatively long.

A DCI format of a downlink control channel, for example, a PDCCH (physical downlink control channel) is used to instruct to trigger activation of one or more groups of the foregoing time-frequency resource information or instruct not to trigger activation of any resource information. Triggering activation of a specific quantity of groups of resource information that is in the foregoing time-frequency resource information or specific groups of resource information that is in the foregoing time-frequency resource information may be indicated by using a specific DCI format. To be specific, the specific DCI format is bound to activation of a specific quantity of groups (or specific groups) of resource information in the foregoing time-frequency resource information that can be triggered. This may be further indicated by using a parameter (field) carried in the DCI format. For example, in a DCI format 4, 2 bits, for example, a Value of SRS request field, may be used to instruct to trigger any type of information in three groups of time-frequency resource information or not trigger any configuration information. There may be a binding relationship between the DCI format 4 and the three groups of time-frequency resource information that can be triggered by using the DCI format 4. This binding relationship may be predetermined by a protocol, without being configured in a communication process. For another example, in DCI formats 0/1A/2A/2B/2C/2D, 1 bit may be used to instruct to trigger one type of resource information or not trigger any resource information, and a specific group of time-frequency resource information that can be triggered by using the DCI formats 0/1A/2B/2C/2D may be determined based on the predetermined binding relationship.

That the uplink measurement reference signal is an SRS is used as an example to describe how a sequence, a time domain resource, and a frequency domain resource of the SRS are configured based on parameters in configuration information.

It may be understood that a manner of configuring a sequence, a time domain resource, and a frequency domain resource of an NZP SRS based on parameters in configuration information may be the same as a manner of configuring a sequence, a time domain resource, and a frequency domain resource of a ZP SRS based on parameters in configuration information. The following describes the configuration manner for the NZP SRS. For descriptions of this part, refer to descriptions of a configuration manner for the NZP SRS in an existing LTE protocol. It may be understood that these descriptions are merely intended to make the solutions in the embodiments of the present invention clearer, but do not constitute any limitation on the solutions in the embodiments of the present invention. Alternatively, a specific manner of configuring a sequence, a time domain resource, and a frequency domain resource of an NZP SRS or a ZP SRS based on parameters in configuration information may be a manner specified by a protocol in a future communications system, for example, a 5G communications system; and a parameter name, a definition (such as a definition of a time domain resource unit corresponding to a subframe, a slot, a symbol, or the like in LTE), a frame structure, a subcarrier spacing, a cyclic prefix (CP) length, and the like that are different from those in the manner in the LTE protocol may be used. This is not limited herein.

In one embodiment, in a 5G NR communications system, the configuration information of the first uplink measurement reference signal and/or the configuration information of the second uplink measurement reference signal may be partially or completely carried in user-specific (UE-specific) signaling. The configuration information of the first uplink measurement reference signal and/or the configuration information of the second uplink measurement reference signal include/includes at least one of the following: a time resource, a cycle time, a frequency comb, a bandwidth, a frequency hopping bandwidth, a symbol quantity, a subcarrier spacing, a CP length, and a time domain length. The configuration information of the first uplink measurement reference signal and/or the configuration information of the second uplink measurement reference signal may also be understood as information for configuring the resource of the first uplink measurement reference signal and/or the resource of the second uplink measurement reference signal. The configuration information of the first uplink measurement reference signal and/or the configuration information of the second uplink measurement reference signal are/is completely carried in user equipment-specific (UE-specific) signaling, so that the following case can be avoided: In an NR multi-numerology scenario, when configuration information is notified by using cell-specific signaling, because UEs with different numerologies have inconsistent understandings of the configuration information, collision may occur between uplink data channels and uplink measurement reference signals of different UEs. The numerology is a parameter of a frame structure, and may include a subcarrier spacing and/or a CP length.

SRS Sequence Generation

A sequence of an uplink sounding reference signal SRS signal may be:

$$r^{SRS}(n) = r_{u,v}^{(\alpha)}(n)$$
$$= e^{j\alpha n}\bar{r}_{u,v}(n), 0 \le n < M_{sc}^{RS}$$

$M_{sc}^{RS}$ is a sequence length. $u \in \{0, 1, \ldots 29\}$ is a quantity of physical uplink control channel (PUCCH) sequence groups. v is a quantity of base sequences in each group. $\bar{r}_{u,v}(n) = x_q(n \bmod N_{ZC}^{RS})$, $0 \le n < M_{sc}^{RS}$, and $\bar{r}_{u,v}(n)$ is a base sequence.

$$x_q(m) = e^{-j\frac{\pi q m(m+1)}{N_{ZC}^{RS}}}, 0 \le m \le N_{ZC}^{RS} - 1,$$

and $N_{ZC}^{RS}$ is a sequence length less than $M_{sc}^{RS}$. Equations $$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31$$

hold true.

A cyclic shift of the SRS may be:

$$\alpha = 2\pi \frac{n_{SRS}^{cs}}{8}$$

$n_{SRS}^{cs}$ is a configuration parameter (included in the foregoing configuration information, cyclicShift) from each UE, and $n_{SRS}^{cs} \in \{0, 1, 2, 3, 4, 5, 6, 7\}$ that is, there are eight cyclic shifts in total.

SRS Time Domain Resource

A subframe in which an SRS sent by any UE in a cell is located may be determined based on a 4-bit cell-specific "SRS subframe configuration" parameter "srsSubframeConfiguration". There are 16 modes in total, and a position of a subframe in which an SRS can be sent in one physical frame (10 ms) can be configured. $T_{SFC}$ is a subframe configuration period, and $\Delta_{SFC}$ is a cell-specific subframe offset. $\Delta_{SFC}$ is an offset relative to a specific subframe, and is an offset relative to a subframe 0 in LTE. The specific 16 modes are listed in the following Table 3.

TABLE 3

SRS subframe configuration of a frame structure type 1

| srs-SubframeConfig | Binary | Configuration period $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Reserved (Reserved) | Reserved (Reserved) |

For example, in an FDD system, SRS transmission is located in a last OFDM symbol of a configured subframe, and physical uplink shared channel (PUSCH) data transmission is not allowed to be performed in the OFDM symbol allocated to the SRS.

Periodic SRS transmission configuration is performed for UE, and a value of a specific period may be determined based on the parameter Periodicity in the foregoing configuration information. The value of the specific period may be one value in sets such as T1, T2, T3, and T4 in the foregoing configuration information. In one embodiment, a period set may be {2, 5, 10, 20, 40, 80, 160, 320} ms. A specific subframe offset $T_{offset}$ may be configured by using a 10-bit "SRS configuration index or SRS Configuration Index ISRS".

SRS Frequency Domain Resource

No frequency hopping is performed for an aperiodic SRS. However, frequency hopping may be used for a periodic SRS, and in this case, frequency hopping is performed between subframes, and the SRS in different subframes occupies different frequency domain resources.

In an LTE system, a cell-level SRS bandwidth $C_{SRS} \in \{0, 1,2,3,4,5,6,7\}$ and a UE-level SRS bandwidth $B_{SRS}$ (which may be indicated by the parameter SRS-Bandwidth in the foregoing configuration information) are configured by using higher layer signaling, for example, Radio Resource Control (RRC) signaling. One type of cell-level SRS bandwidth may include four types of UE-level SRS bandwidths $B_{SRS} \in \{0,1,2\}$, and a subcarrier comb parameter $\bar{k}_{TC} \in \{0,1\}$ (which may be indicated by the parameter Transmission-Comb in the foregoing configuration information when a subcarrier spacing is only one subcarrier during SRS transmission) and a frequency domain position parameter $n_{RRC}$ (which may be indicated by the parameter FreqDomainPosition in the foregoing configuration information) for SRS transmission are configured. Based on these parameters, the terminal may determine a specific frequency domain resource for SRS transmission.

For details of other aspects of SRS bandwidth configuration and frequency domain resource determining for different uplink bandwidths, refer to descriptions in the 3rd Generation Partnership Project (3GPP) technical specification (Technical Specification, TS) 36.211. Details are not described herein.

An embodiment of the present invention further provides an uplink measurement reference signal transmission method. A power of a non-zero-power uplink measurement reference signal is controlled, to make a transmit power of the non-zero-power uplink measurement reference signal on some preset time-frequency resources be 0 (which is equivalent to sending a zero-power uplink measurement reference signal). Therefore, a wireless network device (for example, a first wireless network device) can measure a received signal on these time-frequency resources, to obtain an interference status of an uplink measurement reference signal of user equipment (for example, first UE).

The preset time-frequency resource may be predefined by a protocol or may be determined based on a configuration of a zero-power uplink measurement reference signal selected by the wireless network device. Different from the embodiment corresponding to FIG. 3a, in this embodiment, configuration information of the zero-power uplink measurement reference signal may not be sent to the UE. Instead, the wireless network device directly performs, based on the configuration, power control on a non-zero-power uplink measurement reference signal on a time-frequency resource indicated by the configuration, measurement of a zero-power uplink measurement reference signal (in other words, to make a transmit power of the non-zero-power uplink measurement reference signal on the time-frequency resource indicated by the configuration be 0).

Specifically, a transmit power $P_{SRS}$ of a non-zero-power uplink measurement reference signal of the user equipment in a time domain resource unit (for example, an $i^{th}$ time domain resource unit) (the time domain resource unit may be defined in a protocol, for example, a subframe or a slot) is:

$$P_{SRS}(i) = \min \{P_{CMAX}(i), P_{SRS\_OFFSET}(m) + 10 \log_{10}(M_{SRS}) + P_{0\_PUSCH}(j) + \alpha(j) \cdot PL + f(i)\} \quad \text{formula (1)}$$

A unit of $P_{SRS}$ may be dBm. $P_{CMAX}(i)$ is a maximum transmit power that is of the user equipment in an $i^{th}$ subframe and that is configured on a network side. $P_{SRS\_OFFSET}(m)$ is a higher layer parameter that is semi-statically configured by a higher layer. For a periodic uplink measurement reference signal, m is equal to 0. For an aperiodic uplink measurement reference signal, m is equal to 1. $M_{SRS}$ is an SRS bandwidth in the $i^{th}$ subframe. All of f(i), $P_{0\_PUSCH}(j)$, and $\alpha(j)$ are power control adjustment values of a physical uplink shared channel (PUSCH). It may be understood that indications, in the parameters (referred to as power configuration parameters) included in the formula, related to the time domain resource unit may be indicated in an existing manner, and these indications may be at a time domain resource unit level (for example, at a subframe level).

The transmit power $P_{SRS}$ of the foregoing uplink measurement reference signal may be configured to be 0 by using a power control parameter (referred to as a zero-power configuration parameter) that is sent by the wireless network device to the UE. For example, $P_{SRS}$ is equal to 0 [dBm]. The power control parameter may be carried in higher layer signaling (for example, RRC signaling), or carried in a downlink control channel, for example, in DCI of the downlink control information. It may be understood that the power control parameter may be configured at a time domain resource unit level. For example, the power control parameter may be indicated in an indication manner of the parameters related to the time domain resource unit in formula (1), for example, the existing indication manner of the parameters related to the time domain resource unit in formula (1).

In this way, when receiving the zero-power configuration parameter, the UE controls the transmit power of the uplink measurement reference signal to be 0; otherwise, the UE determines the transmit power of the uplink measurement reference signal based on the foregoing formula 1.

It may be understood that, based on a change of a protocol or a system requirement, the foregoing formula 1 may alternatively be in another form, or another formula may be used. This is not limited herein.

Figure 3B:
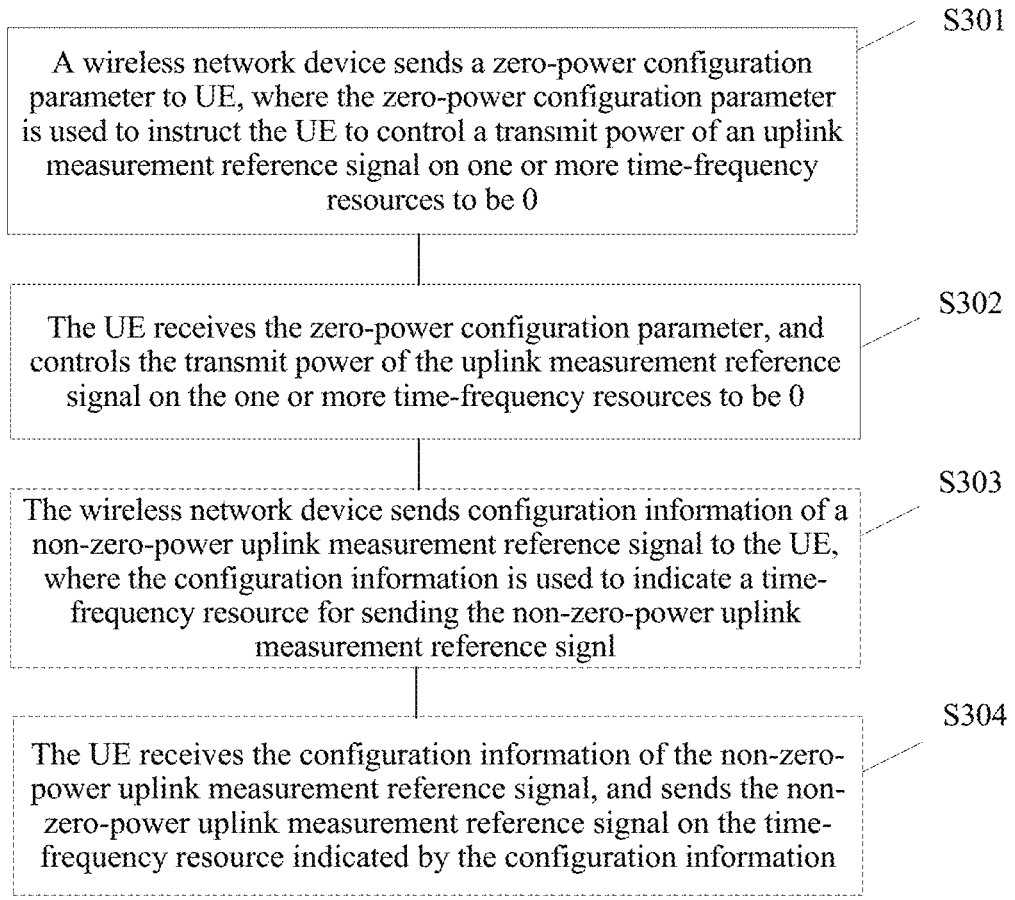
FIG. 3b is a schematic flowchart of another uplink reference signal transmission method according to an embodiment of the present invention.

Specifically, as shown in FIG. 3b, the method may include the following operations.

Operation S301. A wireless network device sends a zero-power configuration parameter to UE, where the zero-power configuration parameter is used to instruct the UE to control a transmit power of an uplink measurement reference signal on one or more time-frequency resources to be 0.

In one embodiment, the zero-power configuration parameter is used to instruct the UE to control a transmit power of an uplink measurement reference signal on one time domain resource unit to be 0.

Operation S302. The UE receives the zero-power configuration parameter, and controls the transmit power of the uplink measurement reference signal on the one or more time-frequency resources to be 0.

In one operation, the method may further include:

Operation S303. The wireless network device sends configuration information of a non-zero-power uplink measurement reference signal to the UE, where the configuration information is used to indicate a time-frequency resource for sending the non-zero-power uplink measurement reference signal.

Operation S304. The UE receives the configuration information of the non-zero-power uplink measurement reference signal from the wireless network device, and sends the non-zero-power uplink measurement reference signal on the time-frequency resource indicated by the configuration information.

The method may not be limited to operations S303 to 304 and S301 to 302.

In one embodiment, a power of the non-zero-power uplink measurement reference signal is determined based on a power configuration parameter from the wireless network device. A priority of the power configuration parameter is lower than that of the zero-power configuration parameter.

In one embodiment, the power configuration parameter includes a parameter at a time domain resource unit level.

In one embodiment, for configuration (configuration of information such as a time-frequency resource or a sequence resource) for the non-zero-power uplink measurement reference signal, refer to descriptions (for example, operations S5 and step S6) of the non-zero-power uplink measurement reference signal in the embodiment corresponding to FIG. 3a. Details are not described herein again.

In this method, the transmit power of the non-zero-power uplink measurement reference signal may be controlled to be 0, so that interference caused to an uplink measurement reference signal of the UE is measurable.

Figure 4A:
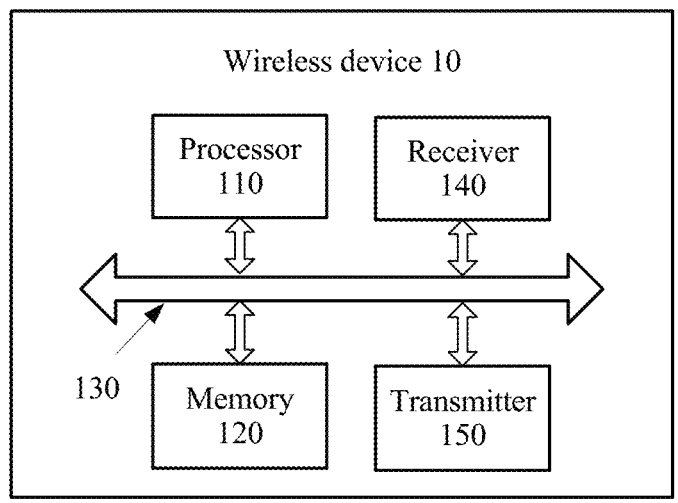
FIG. 4a is a schematic diagram of an uplink reference signal transmission apparatus (for example, a wireless network device) according to an embodiment of the present invention.

According to the foregoing methods, as shown in FIG. 4a, an embodiment of the present invention further provides an uplink measurement reference signal transmission apparatus. The apparatus may be a wireless device 10. The wireless device 10 may correspond to the first wireless network device in the foregoing methods. The first wireless network device may be a base station, or may be another device. This is not limited herein.

The apparatus may include a processor 110, a memory 120, a bus system 130, a receiver 140, and a transmitter 150. The processor 110, the memory 120, the receiver 140, and the transmitter 150 are connected to each other by using the bus system 130. The memory 120 is configured to store an instruction. The processor 110 is configured to execute the instruction stored in the memory 120, to control the receiver 140 to receive a signal and control the transmitter 150 to send a signal, thereby completing the steps performed by the first wireless network device (for example, a base station) in the foregoing methods. The receiver 140 and the transmitter 150 may be a same physical entity or different physical entities. When the receiver 140 and the transmitter 150 are a same physical entity, the receiver 140 and the transmitter 150 may be collectively referred to as a transceiver. The memory 220 may be integrated into the processor 210, or may be disposed independently of the processor 210.

In one embodiment, functions of the receiver 140 and the transmitter 150 may be considered to be implemented by using a transceiver circuit or a dedicated transceiver chip. The processor 110 may be considered to be implemented by using a dedicated processing chip, a processing circuit, a processor, or a universal chip.

In another embodiment, the wireless device provided in this embodiment of the present invention may be considered to be implemented by using a general-purpose computer. To be specific, program code for implementing functions of the processor 110, the receiver 140, and the transmitter 150 is stored in the memory, and the general-purpose processor executes the code in the memory to implement the functions of the processor 110, the receiver 140, and the transmitter 150.

For a concept, explanations, detailed descriptions, and other operations that involve the apparatus and are related to the technical solutions provided in the embodiments of the present invention, refer to descriptions of the content in the foregoing methods or other embodiments. Details are not described herein again.

Figure 4B:
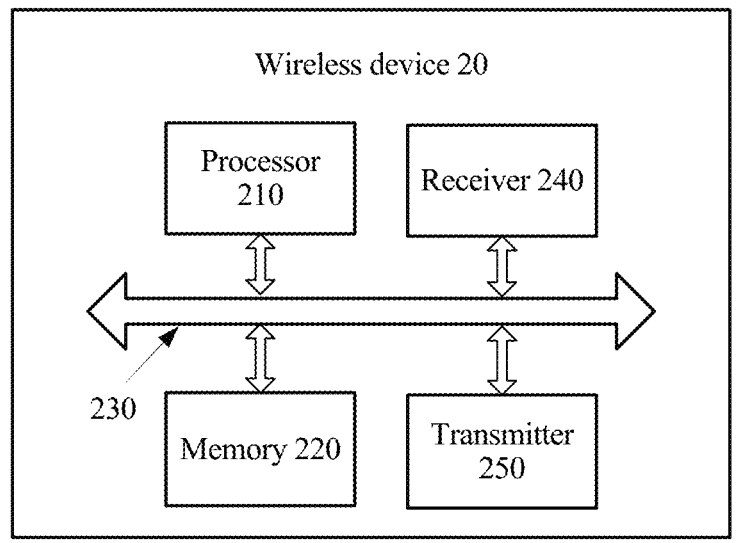
FIG. 4b is a schematic diagram of another uplink reference signal transmission apparatus (for example, user equipment) according to an embodiment of the present invention.

According to the foregoing methods, as shown in FIG. 4b, an embodiment of the present invention further provides another uplink measurement reference signal transmission apparatus. The apparatus may be a wireless device 20. The wireless device 20 may correspond to the first user equipment in the foregoing methods. It may be understood that the wireless device may be UE, or may be a micro base station or a small cell. This is not limited herein.

The apparatus may include a processor 210, a memory 220, a bus system 230, a receiver 240, and a transmitter 250. The processor 210, the memory 220, the receiver 240, and the transmitter 250 are connected to each other by using the bus system 230. The memory 220 is configured to store an instruction. The processor 210 is configured to execute the instruction stored in the memory 220, to control the receiver 240 to receive a signal and control the transmitter 250 to send a signal, thereby completing the steps performed by the first UE in the foregoing methods. The receiver 240 and the transmitter 250 may be a same physical entity or different physical entities. When the receiver 240 and the transmitter 250 are a same physical entity, the receiver 240 and the transmitter 250 may be collectively referred to as a transceiver. The memory 220 may be integrated into the processor 210, or may be disposed independently of the processor 210.

In one embodiment, functions of the receiver 240 and the transmitter 250 may be considered to be implemented by using a transceiver circuit or a dedicated transceiver chip. The processor 210 may be considered to be implemented by using a dedicated processing chip, a processing circuit, a processor, or a universal chip.

In another embodiment, the wireless device provided in this embodiment of the present invention may be considered to be implemented by using a general-purpose computer. To be specific, program code for implementing functions of the processor 210, the receiver 240, and the transmitter 250 is stored in the memory, and the general-purpose processor executes the code in the memory to implement the functions of the processor 210, the receiver 240, and the transmitter 250.

For a concept, explanations, detailed descriptions, and other operations that involve the apparatus and are related to the technical solutions provided in the embodiments of the present invention, refer to descriptions of the content in the foregoing methods or other embodiments. Details are not described herein again.

According to the methods provided in the embodiments of the present invention, an embodiment of the present invention further provides a communications system. The communications system includes the foregoing first wireless network device and one or more user equipment.

It should be understood that in the embodiments of the present invention, the processor 110 or 210 may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

The memory 120 or 220 may include a read-only memory and a random access memory, and provide an instruction and data for the processor 310. A part of the memory may further include a nonvolatile random access memory. For example, the memory may further store information about a device type.

In addition to a data bus, the bus system 130 or 230 may further include a power bus, a control bus, a status signal bus, and the like. However, for clear description, various types of buses in the figure are represented by the bus system.

In an implementation process, the operations in the foregoing methods can be completed by using an integrated logical circuit of hardware in the processor 110 or 210, or by using instructions in a form of software. The operations in the methods disclosed with reference to the embodiments of the present invention may be directly performed by a hardware processor, or may be performed by using a combination of hardware in the processor and a software module. The software module may be located in a storage medium in the art, such as a random access memory, a flash memory, a read-only memory, a programmable read-only memory, an electrically erasable programmable memory, a register, or the like. The storage medium is located in the memory, and the processor reads information from the memory and completes the operations in the foregoing methods in combination with hardware in the processor. To avoid repetition, details are not described herein again.

Figure 5:
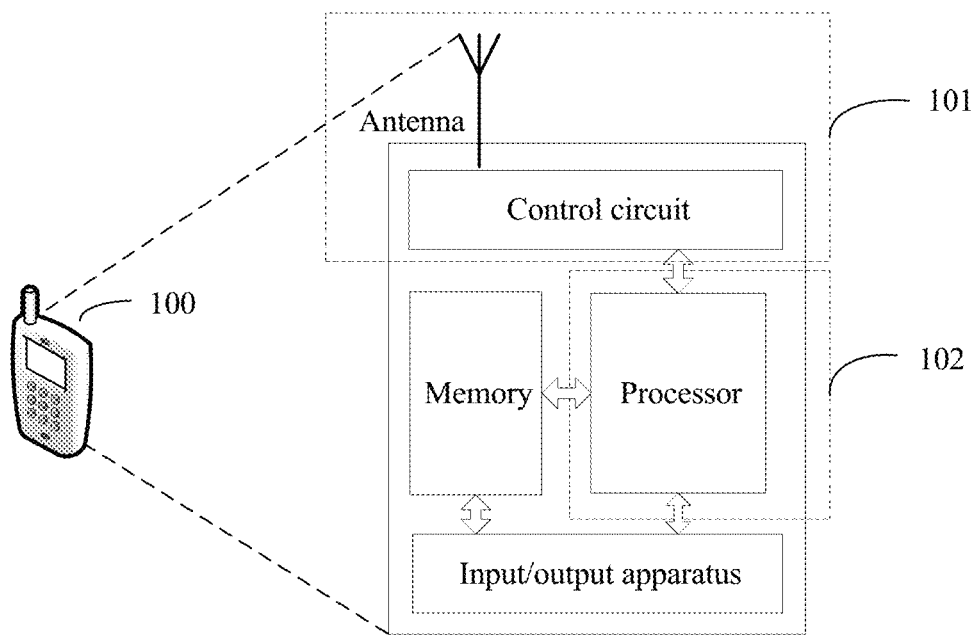
FIG. 5 is a schematic block diagram of a terminal device according to an embodiment of this application.
Figure 6:
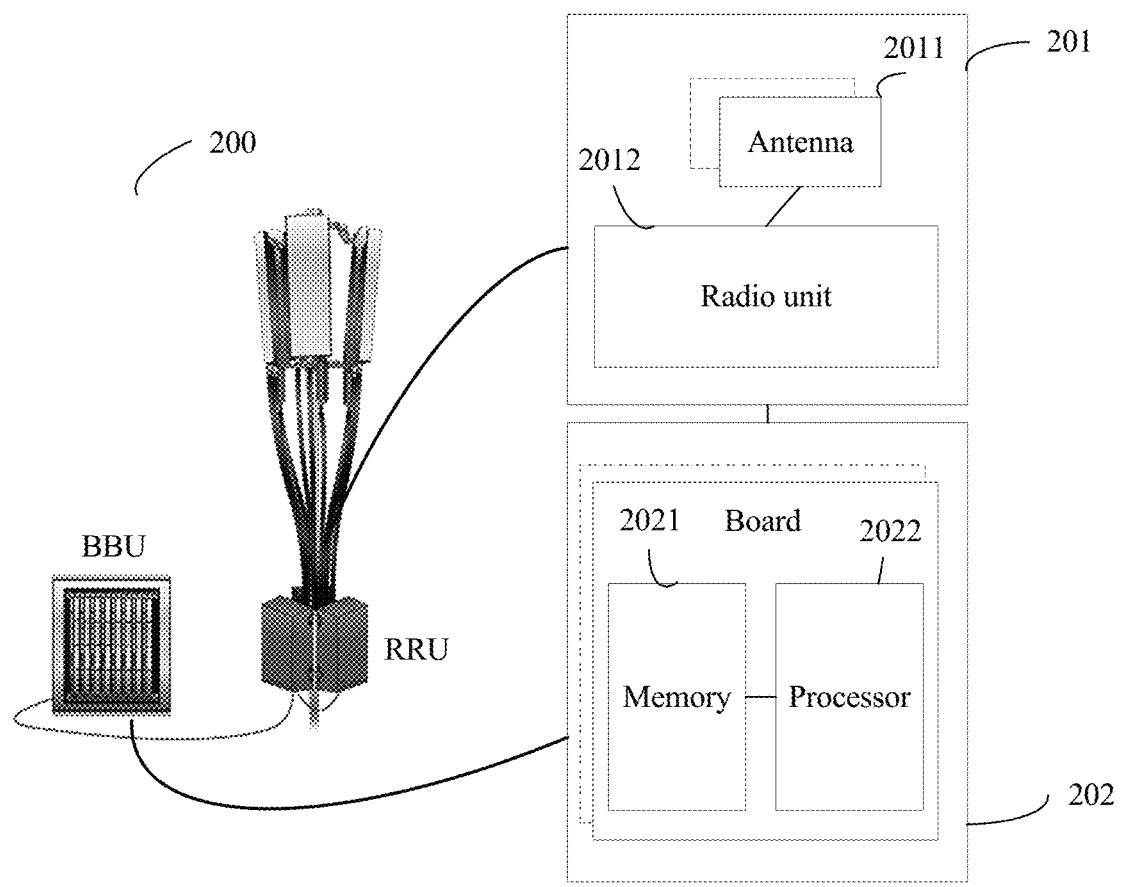
FIG. 6 is a schematic block diagram of a network device according to an embodiment of this application.
Figure 7:
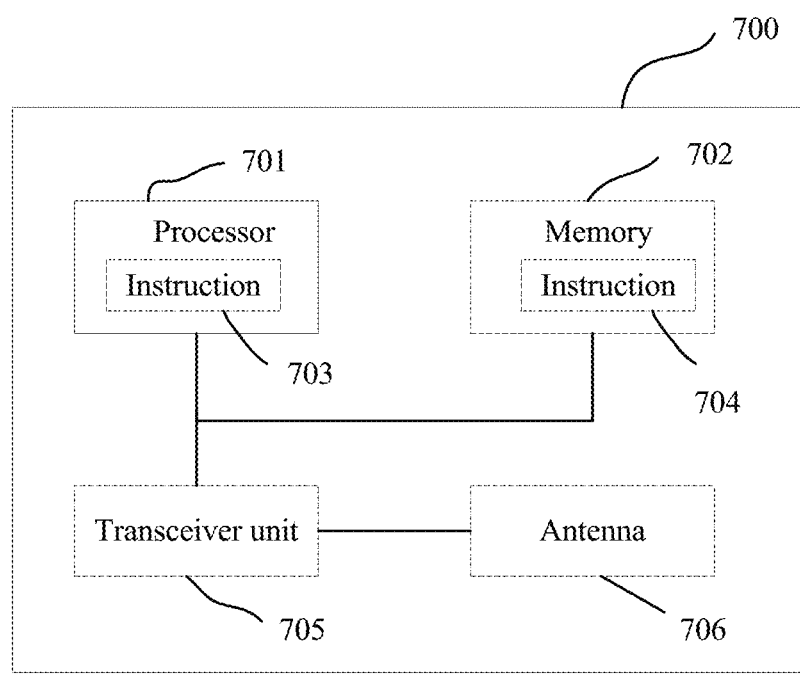
FIG. 7 is a schematic block diagram of a communications apparatus according to an embodiment of this application.

With reference to FIG. 5 to FIG. 7, the following further describes the communications apparatus provided in the embodiments of this application.

FIG. 5 is a schematic structural diagram of a terminal device according to an embodiment of this application. The terminal device may be applicable to the system shown in FIG. 1. For ease of description, FIG. 5 shows only main components of the terminal device. As shown in FIG. 5, the terminal device 100 includes a processor, a memory, a control circuit, an antenna, and an input/output apparatus. The processor is mainly configured to process a communication protocol and communications data, control the entire terminal device, execute a software program, and process data of the software program. For example, the processor is configured to support the terminal device in performing the actions described in the foregoing method embodiments, for example, mapping a first uplink measurement reference signal based on received first configuration information, and/or mapping a second uplink measurement reference signal based on received second configuration information. The memory is mainly configured to store the software program and data, for example, store the correspondence that is between the first indication information and the first configuration information and/or the second configuration information and that is described in the foregoing embodiments. The control circuit is mainly configured to: perform conversion between a baseband signal and a radio frequency signal, and process a radio frequency signal. A combination of the control circuit and the antenna may also be referred to as a transceiver that is mainly configured to send/receive a radio frequency signal in an electromagnetic wave form. The input/output apparatus such as a touchscreen, a display screen, or a keyboard is mainly configured to: receive data entered by a user, and output data to the user.

After the terminal device is powered on, the processor may read the software program from the storage unit, execute an instruction of the software program, and process the data of the software program. When the processor needs to send data by using the antenna, after performing baseband processing on the to-be-sent data, the processor outputs a baseband signal to a radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 5 shows only one memory and only one processor. An actual terminal device may have a plurality of processors and a plurality of memories. The memory may also be referred to as a storage medium, a storage device, or the like. This is not limited in this embodiment of the present invention.

In one embodiment, the processor may include a baseband processor and a central processing unit. The baseband processor is mainly configured to process a communication protocol and communications data, and the central processing unit is mainly configured to: control the entire terminal device, execute a software program, and process data of the software program. Functions of the baseband processor and the central processing unit may be integrated into the processor in FIG. 5. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may also be referred to as a baseband processing circuit or a baseband processing chip. The central processing unit may also be referred to as a central processing circuit or a central processing chip. A function of processing a communication protocol and communications data may be built into the processor, or may be stored in the storage unit in a form of a software program. The processor executes the software program to implement a baseband processing function.

In this embodiment of the present invention, the antenna and the control circuit that have a sending/receiving function may be considered as a transceiver unit 101 of the terminal device 100. For example, the transceiver unit 101 is configured to support the terminal device in implementing the receiving function described in the foregoing method or apparatus part. The processor that has a processing function is considered as a processing unit 102 of the terminal device 10. As shown in FIG. 5, the terminal device 100 includes the transceiver unit 101 and the processing unit 102. The transceiver unit may also be referred to as a transceiver, a transceiver apparatus, or the like. In one embodiment, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. The receiving unit may also be referred to as a receiver, an input port, a receiver circuit, or the like, and the sending unit may be referred to as a transmitter, a transmitter, a transmitter circuit, or the like.

The processor 102 may be configured to execute an instruction stored in the memory, to control the transceiver unit 101 to receive a signal and/or send a signal, thereby completing a function of the terminal device in the foregoing method embodiments. In an implementation, functions of the transceiver unit 101 may be considered to be implemented by using a transceiver circuit or a dedicated transceiver chip.

FIG. 6 is a schematic structural diagram of a network device according to an embodiment of this application, for example, a schematic structural diagram of a base station. As shown in FIG. 6, the base station may be applied to the system shown in FIG. 1, and implements a function of the network device in the foregoing method embodiments. The base station 200 includes one or more radio frequency units such as a remote radio unit (RRU) 201 and one or more baseband units (BBU) (which may also be referred to as digital units (DU)) 202. The RRU 201 may be referred to as a transceiver unit, a transceiver, a transceiver circuit, or the like, and the RRU 201 may include at least one antenna 2011 and at least one radio frequency unit 2012. The RRU 201 is mainly configured to: send/receive a radio frequency signal and perform conversion between a radio frequency signal and a baseband signal. For example, the RRU 201 is configured to send the signaling messages described in the foregoing embodiments to a terminal device. The BBU 202 is mainly configured to: perform baseband processing, control the base station, and the like. The RRU 201 and the BBU 202 may be physically disposed together, or may be physically disposed separately in a distributed base station.

The BBU 202 is a control center of the base station, may also be referred to as a processing unit, and is mainly configured to complete baseband processing functions such as channel coding, multiplexing, modulation, and spreading. For example, the BBU (the processing unit) may be configured to control the base station to perform the operation procedures related to the network device in the foregoing method embodiments.

In an example, the BBU 202 may include one or more boards, and a plurality of boards may jointly support a radio access network (for example, an LTE network) in a single access standard, or may separately support radio access networks (such as an LTE network, a 5G network, or another network) in different access standards. The BBU 202 further includes a memory 2021 and a processor 2022. The memory 2021 is configured to store a necessary instruction and necessary data. For example, the memory 2021 stores the correspondence between the first indication information and the first configuration information and/or the second configuration information in the foregoing embodiments. The processor 2022 is configured to control the base station to perform a necessary action. For example, the processor 2022 is configured to control the base station to perform the operation procedures related to the network device in the foregoing method embodiments. The memory 2021 and the processor 2022 may serve the one or more boards. In other words, a memory and a processor may be disposed on each board, or a plurality of boards may share a same memory and a same processor. In addition, a necessary circuit may be further disposed on each board.

FIG. 7 is a schematic structural diagram of a communications apparatus 700. The apparatus 700 may be configured to implement the methods described in the foregoing method embodiments. Reference may be made to the descriptions in the foregoing method embodiments. The communications apparatus 700 may be a chip, a network device (for example, a base station), a terminal device, another network device, or the like.

The communications apparatus 700 includes one or more processors 701. The processor 701 may be a general-purpose processor, a dedicated processor, or the like. For example, the processor 701 may be a baseband processor or a central processing unit. The baseband processor may be configured to process a communication protocol and communications data. The central processing unit may be configured to control the communications apparatus (for example, a base station, a terminal, or a chip), execute a software program, and process data of the software program.

The communications apparatus 700 includes one or more processors 701, and the one or more processors 701 can implement the methods performed by the network device or the terminal device in the foregoing embodiments.

In one embodiment, the communications apparatus 700 includes a component (means) configured to receive first configuration information and/or second configuration information, and a component (means) configured to send a second uplink measurement reference signal. The one or more processors may be configured to implement functions of a component (means) that parses the received first configuration information and/or second configuration information and a means configured to map a first uplink measurement reference signal and/or the second uplink measurement reference signal. For example, the one or more processors may be configured to: parse the received first configuration information and/or second configuration information, and map the first uplink measurement reference signal and/or the second uplink measurement reference signal. A transceiver, an input/output circuit, or an interface of a chip may be configured to: receive the first configuration information and/or the second configuration information, and send the second uplink measurement reference signal. For the first configuration information and/or the second configuration information, and the second uplink measurement reference signal, refer to related descriptions in the foregoing method embodiments.

In one embodiment, the communications apparatus 700 includes a component (means) configured to send first configuration information and/or second configuration information, and a component (means) configured to receive a second uplink measurement reference signal. For the first configuration information and/or the second configuration information, refer to related descriptions in the foregoing method embodiments. For example, the one or more processors may be configured to: generate the first configuration information and/or the second configuration information, and parse the second uplink measurement reference signal. A transceiver, an input/output circuit, or an interface of a chip may be configured to: send the first configuration information and/or the second configuration information, and receive the second uplink measurement reference signal.

In one embodiment, the processor 701 may further implement other functions in addition to the methods in the foregoing embodiments.

In one embodiment, in a design, the processor 701 may also include an instruction 703. The instruction may run on the processor, so that the communications apparatus 700 performs the methods described in the foregoing method embodiments.

In yet another embodiment, the communications apparatus 700 may alternatively include a circuit. The circuit can implement the functions in the foregoing method embodiments.

In one embodiment, the communications apparatus 700 may include one or more memories 702. The one or more memories 702 store an instruction 704. The instruction may run on the processor, so that the communications apparatus 700 performs the methods described in the foregoing method embodiments. In one embodiment, the memory may further store data. In one embodiment, the processor may also store an instruction and/or data. For example, the one or more memories 702 may store the correspondence that is between the indication information and the combination information and that is described in the foregoing embodiments, a parameter related to the combination information, or a related parameter or table that is used in the foregoing embodiments. The processor and the memory may be disposed separately, or may be integrated.

In one embodiment, the communications apparatus 700 may further include a transceiver unit 705 and an antenna 706. The processor 701 may be referred to as a processing unit, and controls the communications apparatus (the terminal or the base station). The transceiver unit 705 may be referred to as a transceiver, a transceiver circuit, or the like, and is configured to implement a sending/receiving function of the communications apparatus by using the antenna 706.

An embodiment of this application further provides a communications system. The communications system includes the foregoing network device and one or more terminal devices.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a nonvolatile random access memory.

In addition to a data bus, the bus system may further include a power bus, a control bus, a status signal bus, and the like. However, for clear description, various types of buses in the figure are represented by the bus system.

In one embodiment, the operations in the foregoing methods can be completed by using an integrated logical circuit of hardware in the processor, or by using instructions in a form of software. The operations in the methods disclosed with reference to the embodiments of this application may be directly performed by a hardware processor, or may be performed by using a combination of hardware in the processor and a software module. The software module may be located in a storage medium in the art, such as a random access memory, a flash memory, a read-only memory, a programmable read-only memory, an electrically erasable programmable memory, a register, or the like. The storage medium is located in the memory, and the processor reads information from the memory and completes the steps in the foregoing methods in combination with hardware in the processor. To avoid repetition, details are not described herein again.

It should also be understood that "first", "second", "third", "fourth", and various numbers in this specification are merely used for differentiation for ease of description, but are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of the present invention.

A person skilled in the art may clearly understand that, for the purpose of convenient and brief description, for detailed working processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the foregoing described apparatus embodiments are merely examples. For example, the division of the function among the units or modules is merely logical function division, and there may be other ways of division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one place, or may be distributed on a plurality of network units. Some or all of the units may be selected depending on an actual requirement to achieve the objectives of the solutions of the embodiments.

In addition, function units in the embodiments of the present invention may be integrated into one processing unit, or each of the units may exist alone physically, or at least two units may be integrated into one unit.

When the functions are implemented in a form of a software function unit and sold or used as an independent product, the functions may be stored in a computer-readable storage medium. Based on such an understanding, the technical solutions of the present invention essentially, or some of the technical solutions may be embodied in a form of a software product. The computer software product is stored in a storage medium, and includes several instructions for enabling a computer device (which may be a personal computer, a server, a network device, or the like) to perform all or some of the steps in the methods in the embodiments of the present invention. The storage medium includes various types of media that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An uplink reference signal transmission method, comprising:
   receiving, by a terminal device, a first configuration information of a first uplink measurement reference signal and a second configuration information of a second uplink measurement reference signal from a wireless network device, wherein the first configuration information is used to configure a time-frequency resource of the first uplink measurement reference signal, the second configuration information is used to configure a time-frequency resource of the second uplink measurement reference signal, wherein the first uplink measurement reference signal is a zero-power uplink measurement reference signal, and the second uplink measurement reference signal is a non-zero-power uplink measurement reference signal;
   sending, by the terminal device, based on the first configuration information and the second configuration information, the second uplink measurement reference signal on a time-frequency resource that is other than the time-frequency resource of the first uplink measurement reference signal but in the time-frequency resource of the second uplink measurement reference signal, wherein the first uplink measurement reference signal includes an uplink sounding reference signal (SRS) and the second uplink measurement reference signal includes an uplink sounding reference signal (SRS); and
   receiving, by the terminal device, a first indication from the wireless network device, wherein the first indication is used to indicate whether the first uplink measurement reference signal that is configured by the first configuration information is transmitted as periodic transmissions, or aperiodic transmissions,
   wherein a quantity of types of information in the first configuration information used to configure the first uplink measurement reference signal for aperiodic transmissions is less than a quantity of types of information in the first configuration information used to configure the first uplink measurement reference signal for periodic transmissions, or
   a quantity of candidate sets of information in the first configuration information used to configure the first uplink measurement reference signal for aperiodic transmissions is less than a quantity of candidate sets of information in the first configuration information used to configure the first uplink measurement reference signal for periodic transmissions.

2. The method according to claim 1, wherein one or more of the first configuration information and the second configuration information is carried in higher layer signaling.

3. The method according to claim 1, wherein the time-frequency resource of the first uplink measurement reference signal is a subset of the time-frequency resource of the second uplink measurement reference signal.

4. The method according to claim 1, wherein the first configuration information of the first uplink measurement reference signal and the second configuration information of the second uplink measurement reference signal are included in a same uplink measurement reference signal process.

5. The method according to claim 1, wherein the receiving by the terminal device a first configuration information of a first uplink measurement reference signal and a second configuration information of a second uplink measurement reference signal from the wireless network device comprises:
   receiving, by the terminal device, a first indication and a third configuration information from the wireless network device, wherein the first indication is used to indicate whether the received third configuration information comprises the first configuration information of the first uplink measurement reference signal or the second configuration information of the second uplink measurement reference signal.

6. The method according to claim 5, wherein the third configuration information further comprises the first indication.

7. The method according to claim 5, wherein the first indication is carried in a downlink control information (DCI) field or a higher layer signaling.

8. The method according to claim 1,
   wherein the first indication is used to indicate whether the first uplink measurement reference signal that is configured by the first configuration information is transmitted as semi-persistent transmissions.

9. The method according to claim 8, wherein the first indication is carried in a higher layer signaling.

10. The method according to claim 8, wherein the first uplink measurement reference signal occupies, during the aperiodic transmissions, all subcarriers within a bandwidth of the first uplink measurement reference signal in a symbol to which the first uplink measurement reference signal is mapped.

11. The method according to claim 1, wherein the first configuration information of the first uplink measurement reference signal is used to indicate a time-frequency resource for aperiodic transmissions of the first uplink measurement reference signal and to indicate a plurality of groups of time-frequency resources of the first uplink measurement reference signal, and the method further comprises:
   receiving, by the terminal device, a trigger information from the wireless network device, wherein the trigger information is used to trigger at least one of the plurality of groups of time-frequency resources; and sending, by the terminal device, the second uplink measurement reference signal on a time-frequency resource that is other than a triggered time-frequency resource in the plurality of groups of time-frequency resources but in the time-frequency resource of the second uplink measurement reference signal.

12. The method according to claim 11, wherein the first configuration information is carried in a higher layer signaling, and the trigger information is carried in a downlink control information (DCI) field.

13. The method according to claim 1, further comprising:
receiving, by the terminal device, at least one of an uplink data channel and an uplink control channel, wherein at least one of the uplink data channel and the uplink control channel is mapped to a time-frequency resource other than the time-frequency resource of the first uplink measurement reference signal.

14. A communications apparatus, comprising: a processor, a memory, and a transceiver unit, wherein the memory is configured to store instructions, and the processor is configured to execute the instructions to:
control the transceiver unit to receive and send signals;
receive a first configuration information of a first uplink measurement reference signal and a second configuration information of a second uplink measurement reference signal from a wireless network device, wherein the first configuration information is used to configure a time-frequency resource of the first uplink measurement reference signal, the second configuration information is used to configure a time-frequency resource of the second uplink measurement reference signal, wherein the first uplink measurement reference signal is a zero-power uplink measurement reference signal, and the second uplink measurement reference signal is a non-zero-power uplink measurement reference signal; and
send, based on the first configuration information and the second configuration information, the second uplink measurement reference signal on a time-frequency resource that is other than the time-frequency resource of the first uplink measurement reference signal but in the time-frequency resource of the second uplink measurement reference signal, wherein the first uplink measurement reference signal includes an uplink sounding reference signal (SRS) and the second uplink measurement reference signal includes an uplink sounding reference signal (SRS); and
receive a first indication from the wireless network device, wherein the first indication is used to indicate whether the first uplink measurement reference signal that is configured by the first configuration information is transmitted as periodic transmissions, or aperiodic transmissions,
wherein a quantity of types of information in the first configuration information used to configure the first uplink measurement reference signal for aperiodic transmissions is less than a quantity of types of information in the first configuration information used to configure the first uplink measurement reference signal for periodic transmissions, or
a quantity of candidate sets of information in the first configuration information used to configure the first uplink measurement reference signal for aperiodic transmissions is less than a quantity of candidate sets of information in the first configuration information used to configure the first uplink measurement reference signal for periodic transmissions.

15. The communication apparatus of claim 14, wherein the time-frequency resource of the first uplink measurement reference signal is a subset of the time-frequency resource of the second uplink measurement reference signal.

16. The communication apparatus of claim 14, wherein to receive a first configuration information of a first uplink measurement reference signal and a second configuration information of a second uplink measurement reference signal from a wireless network device, the processor is further configured to execute the instructions to:
receive a first indication and a third configuration information from the wireless network device, wherein the first indication is used to indicate whether the received third configuration information comprises the first configuration information of the first uplink measurement reference signal or the second configuration information of the second uplink measurement reference signal.

17. The communication apparatus of claim 14,
wherein the first indication is used to indicate whether the first uplink measurement reference signal that is configured by the first configuration information is transmitted as semi-persistent transmissions.

18. The communication apparatus of claim 14, wherein the first configuration information of the first uplink measurement reference signal is used to indicate a time-frequency resource for aperiodic transmissions of the first uplink measurement reference signal and to indicate a plurality of groups of time-frequency resources of the first uplink measurement reference signal, and wherein the processor is further configured to execute the instructions to:
receive a trigger information from the wireless network device, wherein the trigger information is used to trigger at least one of the plurality of groups of time-frequency resources; and
send the second uplink measurement reference signal on a time-frequency resource that is other than a triggered time-frequency resource in the plurality of groups of time-frequency resources but in the time-frequency resource of the second uplink measurement reference signal.

19. A non-transitory computer-readable storage medium having instructions stored therein, which when executed by a processor, causes the processor to perform an uplink reference signal transmission method, the method comprising:
receiving, by a terminal device, a first configuration information of a first uplink measurement reference signal and a second configuration information of a second uplink measurement reference signal from a wireless network device, wherein the first configuration information is used to configure a time-frequency resource of the first uplink measurement reference signal, the second configuration information is used to configure a time-frequency resource of the second uplink measurement reference signal, wherein the first uplink measurement reference signal is a zero-power uplink measurement reference signal, and the second uplink measurement reference signal is a non-zero-power uplink measurement reference signal;
sending, by the terminal device, based on the first configuration information and the second configuration information, the second uplink measurement reference signal on a time-frequency resource that is other than the time-frequency resource of the first uplink measurement reference signal but in the time-frequency resource of the second uplink measurement reference signal; and receiving, by the terminal device, a first indication from the wireless network device, wherein the first indication is used to indicate whether the first uplink measurement reference signal that is configured by the first configuration information is transmitted as periodic transmissions, or aperiodic transmissions, wherein a quantity of types of information in the first configuration information used to configure the first uplink measurement reference signal for aperiodic transmissions is less than a quantity of types of information in the first configuration information used to configure the first uplink measurement reference signal for periodic transmissions, or a quantity of candidate sets of information in the first configuration information used to configure the first uplink measurement reference signal for aperiodic transmissions is less than a quantity of candidate sets of information in the first configuration information used to configure the first uplink measurement reference signal for periodic transmissions.

* * * * *